US008547386B2

(12) United States Patent
Odagiri

(10) Patent No.: US 8,547,386 B2
(45) Date of Patent: Oct. 1, 2013

(54) IMAGE PROCESSING DEVICE AND NON-TRANSITORY COMPUTER-READABLE STORAGE MEDIUM

(75) Inventor: Wakana Odagiri, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 146 days.

(21) Appl. No.: 13/017,316

(22) Filed: Jan. 31, 2011

(65) Prior Publication Data
US 2011/0187732 A1 Aug. 4, 2011

(30) Foreign Application Priority Data
Feb. 4, 2010 (JP) ................................. 2010-023241

(51) Int. Cl.
*G09G 5/00* (2006.01)
(52) U.S. Cl.
USPC .......................................... 345/582; 345/581
(58) Field of Classification Search
USPC ........................................................ 345/582
See application file for complete search history.

(56) References Cited

U.S. PATENT DOCUMENTS

| | | | | | |
|---|---|---|---|---|---|
| 4,956,872 | A | * | 9/1990 | Kimura | 382/283 |
| 5,245,432 | A | * | 9/1993 | Jaffray et al. | 348/578 |
| 7,602,993 | B2 | * | 10/2009 | Nishiyama | 382/282 |
| 7,711,190 | B2 | * | 5/2010 | Yamaguchi | 382/181 |
| 7,711,192 | B1 | * | 5/2010 | Smirnov | 382/182 |
| 8,085,333 | B2 | * | 12/2011 | Kato | 348/333.12 |
| 8,166,409 | B2 | * | 4/2012 | Koike et al. | 715/764 |
| 8,184,925 | B1 | * | 5/2012 | Berridge | 382/274 |
| 2004/0208388 | A1 | * | 10/2004 | Schramm et al. | 382/254 |
| 2005/0001854 | A1 | * | 1/2005 | Schuster et al. | 345/639 |
| 2006/0132507 | A1 | * | 6/2006 | Wang | 345/660 |
| 2008/0025648 | A1 | * | 1/2008 | Maeda et al. | 382/305 |
| 2008/0212879 | A1 | * | 9/2008 | Torii et al. | 382/195 |
| 2008/0232698 | A1 | * | 9/2008 | Shi et al. | 382/225 |
| 2008/0292145 | A1 | * | 11/2008 | Kuniba | 382/118 |
| 2008/0304718 | A1 | * | 12/2008 | Ryuto et al. | 382/118 |
| 2009/0142003 | A1 | * | 6/2009 | Fukuda | 382/286 |
| 2010/0231609 | A1 | * | 9/2010 | Chatting et al. | 345/660 |
| 2011/0063284 | A1 | * | 3/2011 | Sudoh | 345/418 |
| 2011/0316869 | A1 | * | 12/2011 | Kariya et al. | 345/589 |

FOREIGN PATENT DOCUMENTS

| | | |
|---|---|---|
| JP | 2000-105819 A | 4/2000 |
| JP | 2004-021374 A | 1/2004 |
| JP | 2007-295181 A | 11/2007 |

* cited by examiner

*Primary Examiner* — Ryan R Yang
*Assistant Examiner* — Jin Ge
(74) *Attorney, Agent, or Firm* — Holtz, Holtz, Goodman & Chick, PC

(57) ABSTRACT

A painterly conversion unit of an image processing device, for example, converts a main-object image piece and a background image piece into respective painterly images with a fine touch and a rough touch, respectively, when, for example, the ratio of a region representing the main-object image piece relative to a whole image represented by image data is less than a predetermined threshold. Moreover, the painterly conversion unit converts the whole image into a painterly image with a touch of predetermined roughness when the ratio of the region representing the main-object image piece relative to the whole image represented by the image data is equal to or larger than the predetermined threshold.

8 Claims, 18 Drawing Sheets

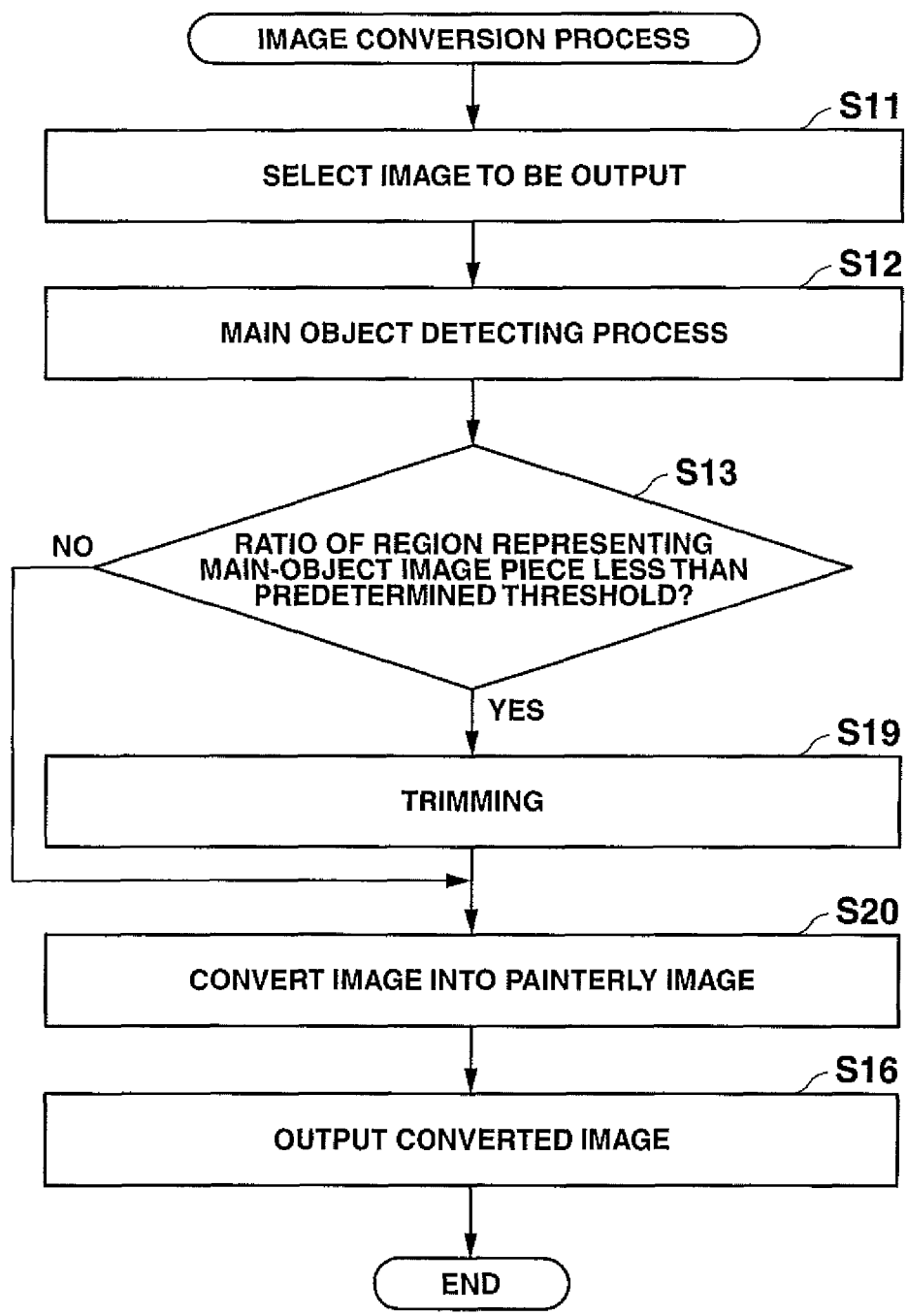

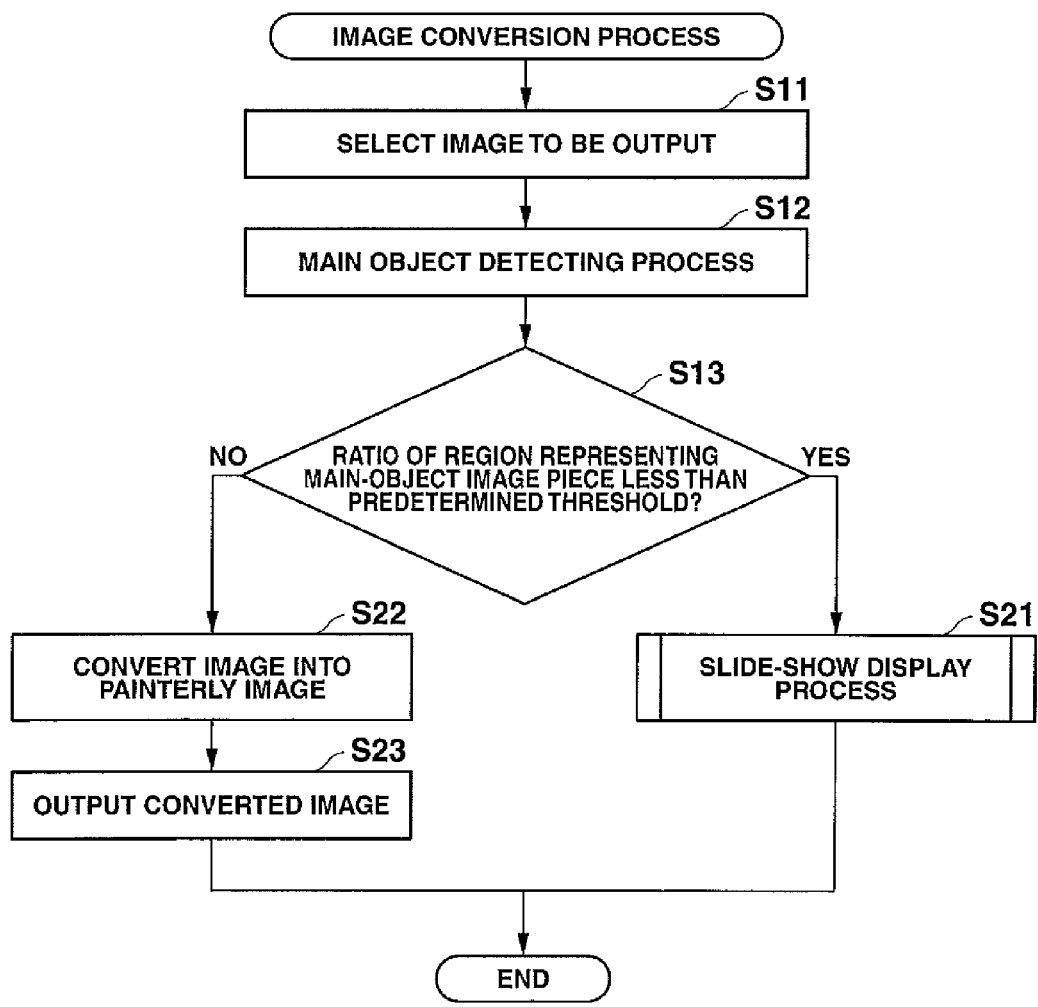

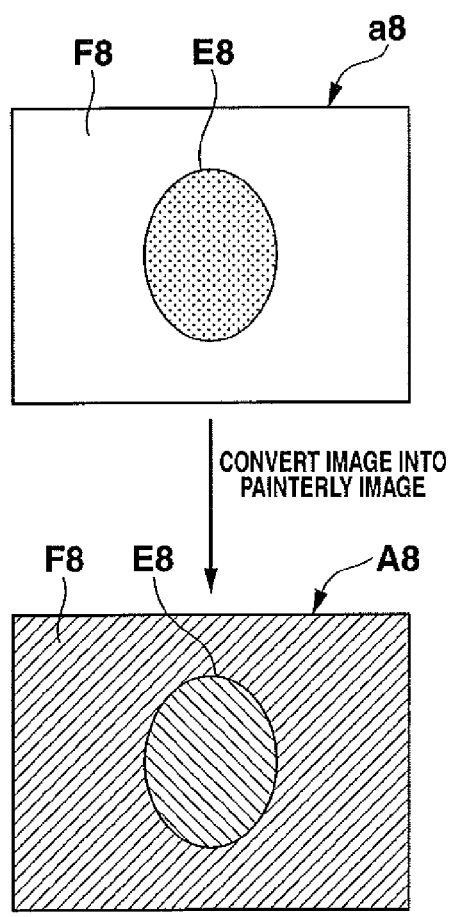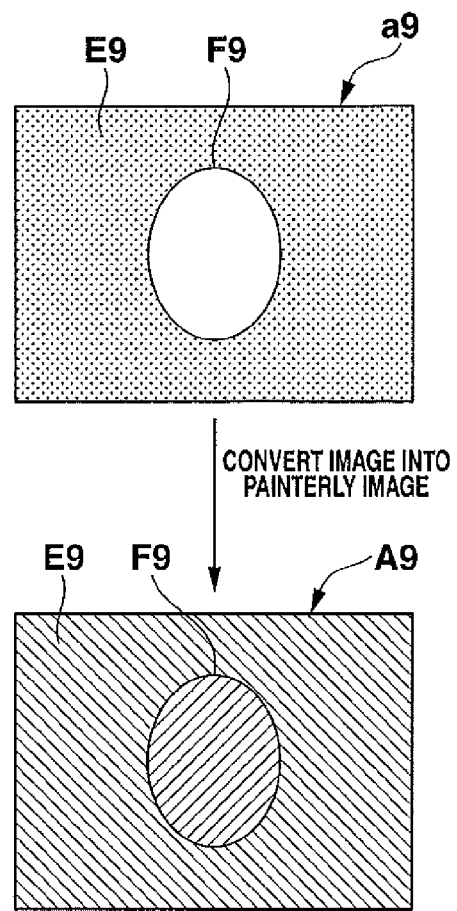

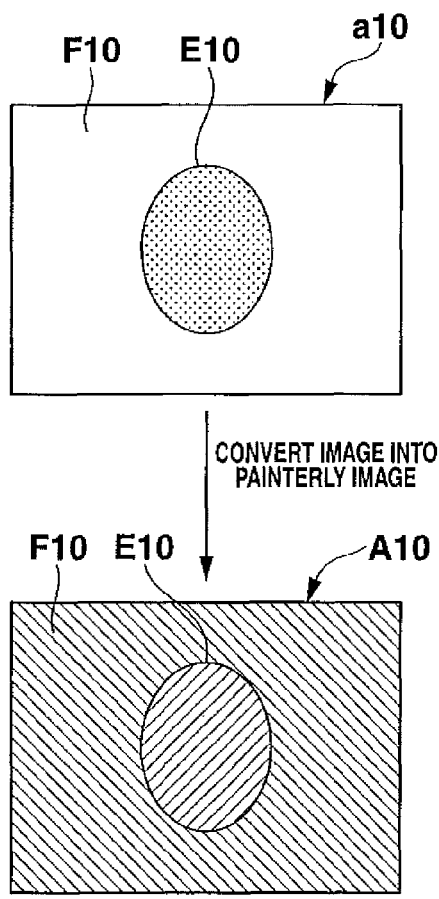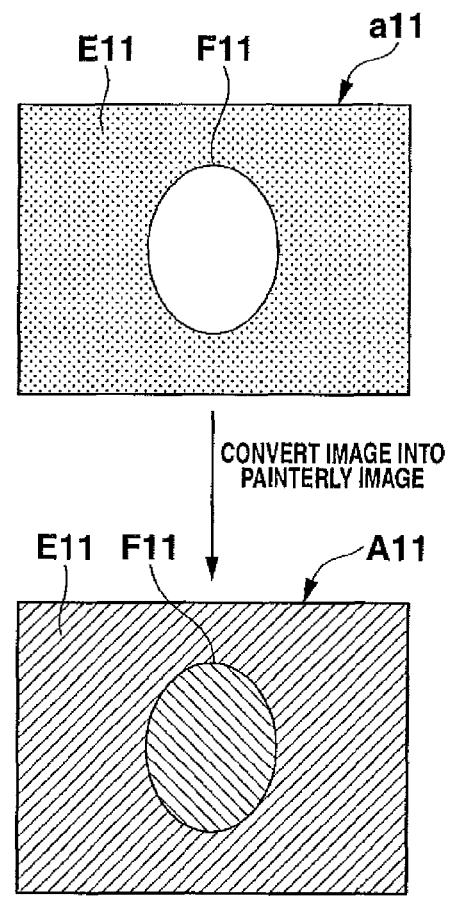

IMAGE PROCESSING DEVICE AND NON-TRANSITORY COMPUTER-READABLE STORAGE MEDIUM

CROSS-REFERENCE TO RELATED APPLICATION

This application claims the benefit of Japanese Patent Application No. 2010-023241, filed Feb. 4, 2010, the entire disclosure of which is incorporated by reference herein.

FIELD

This application relates generally to an image processing device and a non-transitory computer-readable storage medium.

BACKGROUND

Conventionally, there is an image processing device that performs image processing in such a way that the correction intensity of the center of an object (a main object) becomes high and that of a background part becomes small when processing an image picked up by a digital camera or the like. Moreover, there is an image processing device that performs image processing in such a way that the correction intensity of the center of a main object becomes small and the correction intensity gradually becomes high as coming close to a background part (see, for example, Unexamined Japanese Patent Application KOKAI Publication No. 2004-21374).

SUMMARY

According to the image processing device disclosed in Unexamined Japanese Patent Application KOKAI Publication No. 2004-21374, however, the distribution of the correction intensity of an image is set regardless of the way a main object is present, such as the size of the main object and the blurring thereof. Accordingly, depending on the correction intensity, an image having the main object not standing out may be generated.

The present invention is made in view of the forgoing circumstance, and it is an object of the present invention to provide an image processing device and a non-transitory computer-readable storage medium which can perform image processing in accordance with the way a main object is present.

In order to achieve the above-explained object, an image processing device according to a first aspect of the present invention comprises: a main object detecting unit that detects a main-object image piece from an image represented by image data; and a painterly conversion unit that converts the image into a painterly image based on a ratio of a region representing the main-object image piece detected by the main object detecting unit relative to the whole image, wherein the painterly conversion unit: converts the main-object image piece into a painterly image piece by a first touch with a predetermined roughness and converts an image piece in regions other than the region representing the main-object image piece in the whole image into a painterly image piece by a second touch rougher than the first touch when the ratio of the region representing the main-object image piece detected by the main object detecting unit relative to the whole image is less than a predetermined threshold; and converts the image into a painterly image by a third touch with a predetermined roughness when the ratio of the region representing the main-object image piece relative to the whole image is equal to or larger than the predetermined threshold.

In order to achieve the above-explained object, an image processing device according to a second aspect of the present invention comprises: a main object detecting unit that detects a main-object image piece from an image represented by image data; and a painterly conversion unit that converts the image into a painterly image based on a ratio of a region representing the main-object image piece detected by the main object detecting unit relative to the whole image, wherein the painterly conversion unit: converts the image into a painterly image by a first touch with a predetermined roughness when the ratio of the region representing the main-object image piece detected by the main object detecting unit relative to the whole image is less than a predetermined threshold; and converts the image into a painterly image by a second touch rougher than the first touch when the ratio of the region representing the main-object image piece relative to the whole image is equal to or larger than the predetermined threshold.

In order to achieve the above-explained object, an image processing device according to a third aspect of the present invention comprises: a main object detecting unit that detects a main-object image piece from an image represented by image data; and a painterly conversion unit that converts the image into a painterly image based on a ratio of a region representing the main-object image piece detected by the main object detecting unit relative to the whole image, wherein when the ratio of the region representing the main-object image piece detected by the main object detecting unit relative to the whole image is less than a predetermined threshold, the painterly conversion unit specifies a trimming region where the region representing the main-object image piece has a predetermined ratio from the whole image, cuts out an image piece in the specified trimming region, and converts the image piece into a painterly image by a touch with a predetermined roughness.

In order to achieve the above-explained object, an image processing device according to a fourth aspect of the present invention comprises: a main object detecting unit that detects a main-object image piece from an image represented by image data; a painterly conversion unit that converts the image into a painterly image based on a ratio of a region representing the main-object image piece detected by the main object detecting unit relative to the whole image; and an image outputting unit that outputs the image having undergone painterly conversion by the painterly conversion unit, wherein the painterly conversion unit, when the ratio of the region representing the main-object image piece detected by the main object detecting unit is less than a predetermined threshold, specifies a plurality of trimming regions where the ratio of the region representing the main-object image piece differs in the whole image, cuts out respective image pieces in the plurality of specified trimming regions from the image, and converts the plurality of cut images into respective painterly images so that the larger the ratio of the region representing the main-object image piece relative to each of the plurality of trimming regions is, the rougher a touch of the converted image becomes, and the image outputting unit successively outputs the images having undergone painterly conversion by the painterly conversion unit in each of the plurality of trimming regions in an order that the ratio of the region representing the main-object image piece relative to each of the plurality of trimming regions is small.

In order to achieve the above-explained object, an image processing device according to a fifth aspect of the present invention comprises: a blurring detecting unit that detects a blurred region from an image represented by image data; and a painterly conversion unit that converts an image piece in the blurred region detected by the blurring detecting unit and an image piece in a region other than the blurred region into respective painterly images each having a touch of different roughness.

In order to achieve the above-explained object, a non-transitory computer-readable storage medium according to a sixth aspect of the present invention tangibly records a computer program that allows a computer to function as: a main object detecting unit that detects a main-object image piece from an image represented by image data; and a painterly conversion unit that converts the image into a painterly image based on a ratio of a region representing the main-object image piece detected by the main object detecting unit relative to the whole image, wherein the painterly conversion unit: converts the main-object image piece into a painterly image piece by a first touch with a predetermined roughness and converts an image piece in regions other than the region representing the main-object image piece in the whole image into a painterly image piece by a second touch rougher than the first touch when the ratio of the region representing the main-object image piece detected by the main object detecting unit relative to the whole image is less than a predetermined threshold; and converts the image into a painterly image by a third touch with a predetermined roughness when the ratio of the region representing the main-object image piece relative to the whole image is equal to or larger than the predetermined threshold.

In order to achieve the above-explained object, a non-transitory computer-readable storage medium according to a seventh aspect of the present invention tangibly records a computer program that allows a computer to function as: a main object detecting unit that detects a main-object image piece from an image represented by image data; and painterly conversion unit that converts the image into a painterly image based on a ratio of a region representing the main-object image piece detected by the main object detecting unit relative to the whole image, wherein the painterly conversion unit: converts the image into a painterly image by a first touch with a predetermined roughness when the ratio of the region representing the main-object image piece detected by the main object detecting unit relative to the whole image is less than a predetermined threshold, and converts the image into a painterly image by a second touch rougher than the first touch when the ratio of the region representing the main-object image piece relative to the whole image is equal to or larger than the predetermined threshold.

In order to achieve the above-explained object, a non-transitory computer-readable storage medium according to a eighth aspect of the present invention tangibly records a computer program that allows a computer to function as: a main object detecting unit that detects a main-object image piece from an image represented by image data; and a painterly conversion unit that converts the image into a painterly image based on a ratio of a region representing the main-object image piece detected by the main object detecting unit relative to the whole image, wherein when the ratio of the region representing the main-object image piece detected by the main object detecting unit relative to the whole image is less than a predetermined threshold, the painterly conversion unit specifies a trimming region where the region representing the main-object image piece has a predetermined ratio from the whole image, cuts out an image piece in the specified trimming region, and converts the image piece into a painterly image by a touch with a predetermined roughness.

In order to achieve the above-explained object, a non-transitory computer-readable storage medium according to a ninth aspect of the present invention tangibly records a computer program that allows a computer to function as: a main object detecting unit that detects a main-object image piece from an image represented by image data; a painterly conversion unit that converts the image into a painterly image based on a ratio of a region representing the main-object image piece detected by the main object detecting unit relative to the whole image; and an image outputting unit that outputs the image having undergone painterly conversion by the painterly conversion unit, wherein the painterly conversion unit, when the ratio of the region representing the main-object image piece detected by the main object detecting unit relative to the whole image is less than a predetermined threshold, specifies a plurality of trimming regions where the ratio of the region representing the main-object image piece differs in the whole image, cuts out respective image pieces in the plurality of specified trimming regions from the image, and converts the plurality of cut images into respective painterly images so that the larger the ratio of the region representing the main-object image piece relative to each of the plurality of trimming regions is, the rougher a touch of the converted image becomes, and the image outputting unit successively outputs the images having undergone painterly conversion by the painterly conversion unit in each of the plurality of trimming regions in an order that the ratio of the region representing the main-object image piece relative to each of the plurality of trimming regions is small.

In order to achieve the above-explained object, a non-transitory computer-readable storage medium according to a tenth aspect of the present invention tangibly records a computer program that allows a computer to function as: a blurring detecting unit that detects a blurred region from an image represented by image data; and a painterly conversion unit that converts an image piece in the blurred region detected by the blurring detecting unit and an image piece in a region other than the blurred region into respective painterly images each having a touch of different roughness.

BRIEF DESCRIPTION OF THE DRAWINGS

A more complete understanding of this application can be obtained when the following detailed description is considered in conjunction with the following drawings, in which:

FIG. 9 is a flowchart showing an example flow of an image conversion process according to a second modified example of the first embodiment of the present invention;

FIG. 11 is a flowchart showing an example flow of an image conversion process according to a third modified example of the first embodiment of the present invention;

FIG. 16A is a diagram for explaining an image before painterly conversion and an image after painterly conversion;

FIG. 16B is a diagram for explaining an image before painterly conversion and an image after painterly conversion;

FIG. 18A is a diagram for explaining an image before painterly conversion and an image after painterly conversion; and FIG. 18B is a diagram for explaining an image before painterly conversion and an image after painterly conversion.

DETAILED DESCRIPTION

An explanation be given of image processing devices according to embodiments of the present invention. An explanation below will be given of embodiments in which the present invention is applied to a digital photo frame which reads image data from a memory card or the like and which displays an image (which is represented by the image data) like a picture frame. However, the image processing device of the present invention is not limited to the digital photo frame and can be applied in various forms. For example, the present invention can be applied to various electronic devices, such as a computer, a PDA (Personal Digital Assistant), a cellular phone, a digital camera, and a printer.

First Embodiment

In a first embodiment, an explanation will be given of an image processing device 1 that converts an image into a painterly image with the touch of a main-object image piece finer than the touch of a background image piece based on the ratio of an area where the main-object image piece appears relative to the whole region of the image.

In the following explanation, a "main-object image piece" is an image of a major object in an image represented by image data.

Moreover, a "background image piece" is an image of regions other than the region where the main-object image piece appears in the image represented by the image data.

Furthermore, a "touch" (a texture of painting) represents a trace by writing things such as a paintbrush in a painting. It is possible to change the roughness (or fineness) of the touch based on the length, the width, etc., of the trace by the writing things. More specifically, for example, the longer the trace by the writing things are, or the wider the trace by the writing things are, the rougher the touch becomes. According to the first embodiment, a second embodiment to be discussed later, and modified examples of those embodiments, as will be discussed later, when an image represented by image data is converted into a painterly image by an image processing software, the roughness of a touch can be set by setting a parameter as needed.

Figure 1:
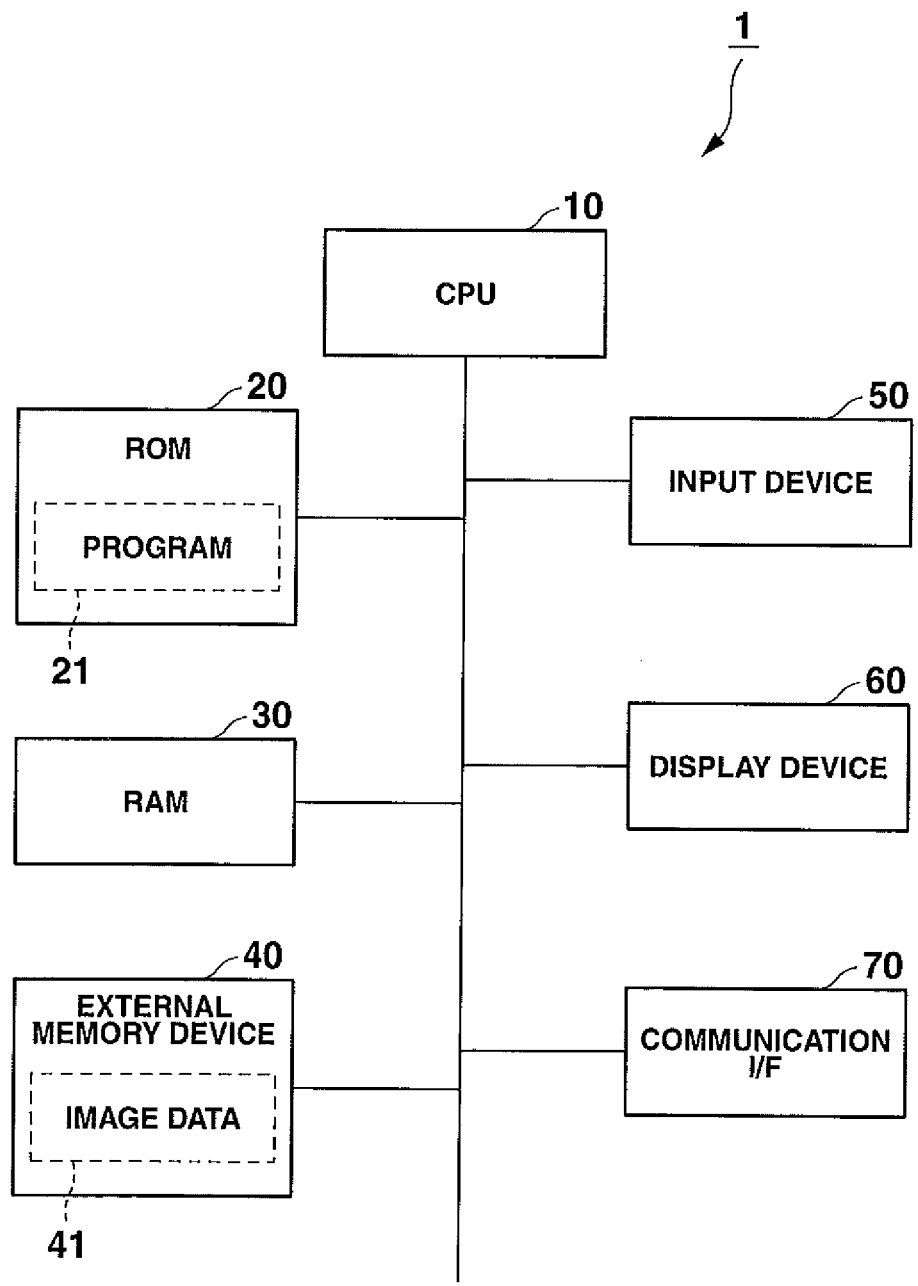
FIG. 1 is a block diagram showing a hardware configuration of an image processing device according to a first embodiment of the present invention.

FIG. 1 is a block diagram showing a hardware configuration of the image processing device 1 of the first embodiment of the present invention.

As shown in FIG. 1, the image processing device 1 includes a CPU (Central Processing Unit) 10, a ROM (Read Only Memory) 20, a RAM (Random Access Memory) 30, an external memory device 40, an input device 50, a display device 60, and a communication I/F (interface) 70.

The CPU 10 loads a program 21 stored in the ROM 20, uses the RAM 30 as a work memory, and executes various arithmetic processes and control processes.

The ROM 20 stores the program 21 and data defining the content of each process (e.g., an image conversion process to be discussed later) beforehand.

Such program 21 and data may be recorded in other memory media than the ROM 20. For example, those may be recorded in a portable memory medium or the like. An example of such memory medium is a CD-ROM (Compact Disk Read Only Memory), a DVD-ROM (Digital Versatile Disk Read Only Memory), a magnetic disk, or non-volatile memory such as a semiconductor memory.

The RAM 30 stores various data read from the ROM 20 and the external memory device 40 when the CPU 10 executes each process.

The external memory device 40 is a memory medium, such as a memory card or an HDD (Hard Disk Drive) in a predetermined standard, and stores image data 41. For example, the image data 41 is data on an image of a subject such as a person, a scenery, etc., picked up by a digital camera or the like, and is stored in the file format like JPEG (Joint Photographic Export Group) or the like.

The input device 50 comprises, for example, a switch and a touch panel, and receives an operational input given by the user.

The display device 60 comprises, for example, a driving circuit, and a display panel, such as a liquid crystal panel or an organic EL (Electro Luminescence) panel. The driving circuit drives the display panel in accordance with image data output by the CPU 10, and causes the display panel to display an image having undergone painterly conversion.

The communication I/F 70 comprises, for example, a wireless communication unit, and is connected to a predetermined network as needed, and communicates with an external server or the like.

Next, an explanation will be given of the configuration of the image processing device 1 according to the first embodiment of the present invention with reference to FIG. 2.

Figure 2:
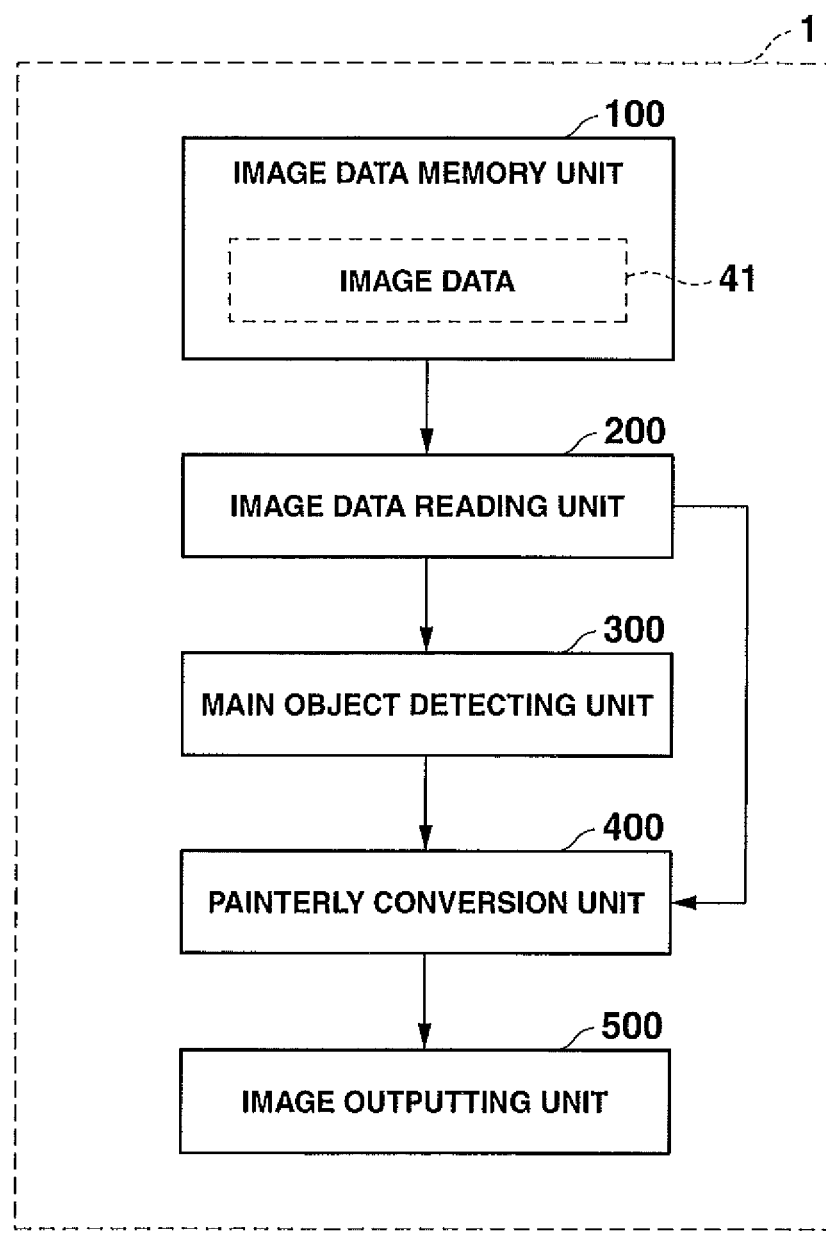
FIG. 2 is a block diagram showing a configuration of the image processing device according to the first embodiment of the present invention.

As shown in FIG. 2, the image processing device 1 includes an image data memory unit 100, an image data reading unit 200, a main object detecting unit 300, a painterly conversion unit 400, and an image outputting unit 500.

The image data memory unit 100 comprises the above-explained external memory device 40, and stores the image data 41. That is, the image data memory unit 100 stores the above-explained image data 41 on an image of a subject such as a person, a scenery, etc.

The image data reading unit 200 comprises the above-explained CPU 10 (more specifically, the CPU 10 that operates in accordance with a driver program for controlling the external memory device 40), etc., and reads the image data 41 stored in the image data memory unit 100 as needed. For example, the image data reading unit 200 reads pieces of image data 41 stored in the image data memory unit 100 in a predetermined order or at random. Moreover, the image data reading unit 200 may read the image data 41 selected by a user from the image data memory unit 100.

The main object detecting unit 300 comprises the above-explained CPU (more specifically, the CPU 10 that executes a main object detecting process to be discussed later), etc., and detects a main-object image piece from an image represented by the image data 41 read by the image data reading unit 200.

An explanation will be given of, as an example of the main object detecting process by the main object detecting unit 300, a case in which a face is detected as a main object. The main object detecting unit 300 detects a face that is a main object through the technology disclosed in, for example, Unexamined Japanese Patent Application KOKAI Publication No. 2000-105819. More specifically, by extracting a flesh-color region from an input image, the main object detecting unit 300 detects a face region.

Figure 3A:
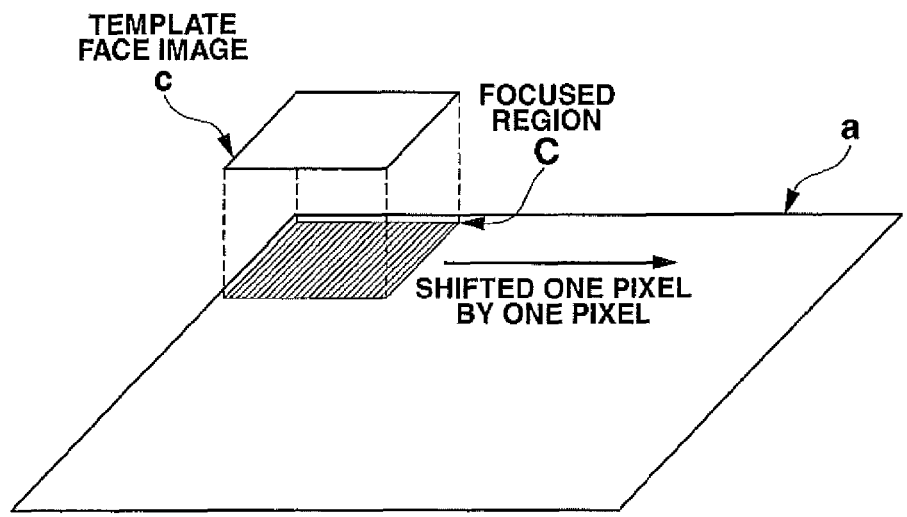
FIG. 3A is a diagram for explaining how to detect a face as a main object.

Typically, as shown in FIG. 3A, a face detecting process compares an image in a focused region C set in an image a with a predetermined template face image c, determines the similarity between those images, and determines whether or not the focused region C is a face region based on the similarity. Determination of the similarity is made by extracting a feature amount effective for identifying whether or not it is a face.

The effective feature amount means a horizontal edge, a vertical edge, an obliquely right edge, an obliquely left edge, etc. Moreover, for detection of the similarity, SAD (Sum of Absolute Difference), SSD (Sum of Squared Difference), etc., is applied. The smaller the calculated value by SAD and SSD is, the higher the similarity is to be determined.

The focused region C in the image a is shifted in the horizontal direction or in the vertical direction one pixel by one pixel. An image in the shifted focused region C is compared with the template face image c, the similarity is determined again, and detection is made in the similar fashion. That is, the focused region C is updated and newly set from the upper left to the lower right while being shifted one pixel by one pixel.

Even if a face in the image a has the same shape as that of the template face image c, when respective sizes thereof are very different, the similarity calculated by the main object detecting unit 300 becomes small. Accordingly, in order to make the size of a face in the image a substantially consistent with the size of the template face image c, the whole image a is scaled down or enlarged at a certain rate, and the detection process of a face region is likewise performed on the image after scale down or enlargement.

By repeating the above-explained process, it is possible to detect a face region with an arbitrary size from an image.

Next, as an example of the main object detecting process by the main object detecting unit 300, an explanation will be given of a case in which an arbitrary main object other than a face is detected. In this case, for example, the main object detecting unit 300 can detect an arbitrary main object through, for example, a scheme that appropriates the above-explained detecting process of a face region.

More specifically, an explanation will be given of an example case in which a "dolphin" is detected as a main object from an entire image a1 shown in FIG. 3B. In this case, the main object detecting unit 300 compares an image in the focused region set in the image a1 with a dolphin template image c1, determines the similarity between those images, and determines whether or not a dolphin is contained in the focused region based on the similarity.

In this case, determination of the similarity is made by extracting the feature amount (e.g., a contour of a general dolphin) effective for identifying whether or not it is a dolphin.

The whole image a1 is scaled down (enlarged) at a certain rate, and a detecting process of a dolphin region is likewise performed on the scaled-down (enlarged) image, thereby detecting a dolphin object with an arbitrary size from the image a1.

In the foregoing explanation, the example of the main object to be detected is a "dolphin", but like the case of "dolphin", if template images of, for example, a sky, a ground, a building, a natural object, in a scenery are stored in the ROM 20 or the like beforehand, those can be detected as main objects.

Returning to FIG. 2, the painterly conversion unit 400 comprises the above-explained CPU 10 (more specifically, the CPU 10 that executes a painterly conversion process to be discussed later), etc., and converts, based on a ratio of a region representing a main-object image piece detected by the main object detecting unit 300 relative to the whole image represented by the image data 41, the image into a painterly image.

More specifically, the painterly conversion unit 400 calculates a ratio of the number of pixels in a region representing the main-object image piece detected by the main object detecting unit 300 relative to the number of pixels of the whole image represented by the image data 41 read by the image data reading unit 200. Next, when the calculated ratio is less than a predetermined threshold (e.g., 10%), the painterly conversion unit 400 converts an image of the main-object image piece and an image of the background image piece with a touch at a predetermined roughness (a first touch) and a touch at a predetermined roughness rougher than the first touch (a second touch), respectively, into a painterly image.

Moreover, when the calculated ratio is equal to or larger than the predetermined threshold (e.g., 10%), the painterly conversion unit 400 converts the whole age represented by the image data 41 into a painterly image with a touch at a predetermined roughness (a third touch).

The above-explained predetermined threshold, respective roughness (i.e., parameters of various filters to be discussed later) of various touches (the first touch, the second touch, and the third touch) may be specified by the user beforehand, or may be set as fixed values. Moreover, the roughness of the first touch and that of the second touch are optional as long as the second touch is rougher. Furthermore, the third touch may be same as the first or second touches or may differ from those.

An explanation will be given of the painterly conversion process executed by the painterly conversion unit 400. More specifically, the painterly conversion unit 400 performs an averaging process of averaging pixel values of the contour components of an image represented by the image data 41 in order to obtain an image with a smooth pattern, a darkness emphasizing process of emphasizing a shade, and a brightness correcting process of reducing a middle tone among the tones of brightness, and of emphasizing the difference in the gray scale of the image, thereby converting the image represented by the image data 41 into a painterly image. Those processes are carried out by filter operation (an operation using a filter) in the image processing. The parameter of such a filter is set as needed in accordance with the above-explained various touches.

Such image conversion using a filter executes the similar processes to those of various filters (a colored pencil, water painting, oil painting, etc.) by PHOTOSHOP (registered trademark) by Adobe Systems Incorporated for example. Hence, the painterly conversion unit 400 executes filter operation using parameters of various filters set beforehand corresponding to respective roughness of the various touches (the first touch, the second touch, and the third touch), and converts a main-object image piece, a background image piece or a whole image into a painterly image.

The kinds of filter used in the painterly conversion process may be specified beforehand by the user, or set and fixed beforehand.

The image outputting unit 500 comprises the above-explained display device 60, and outputs an image having undergone painterly conversion by the painterly conversion unit 400. That is, the image outputting unit 500 displays an image having undergone painterly conversion.

Figure 4A:
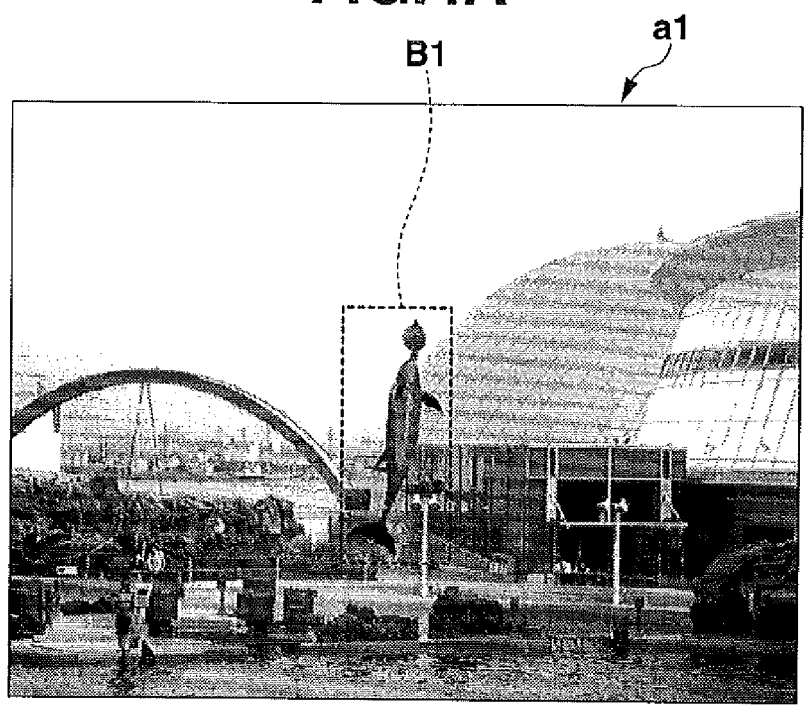
FIG. 4A is a diagram showing an example image where a main-object image piece occupies a small region.
Figure 4B:
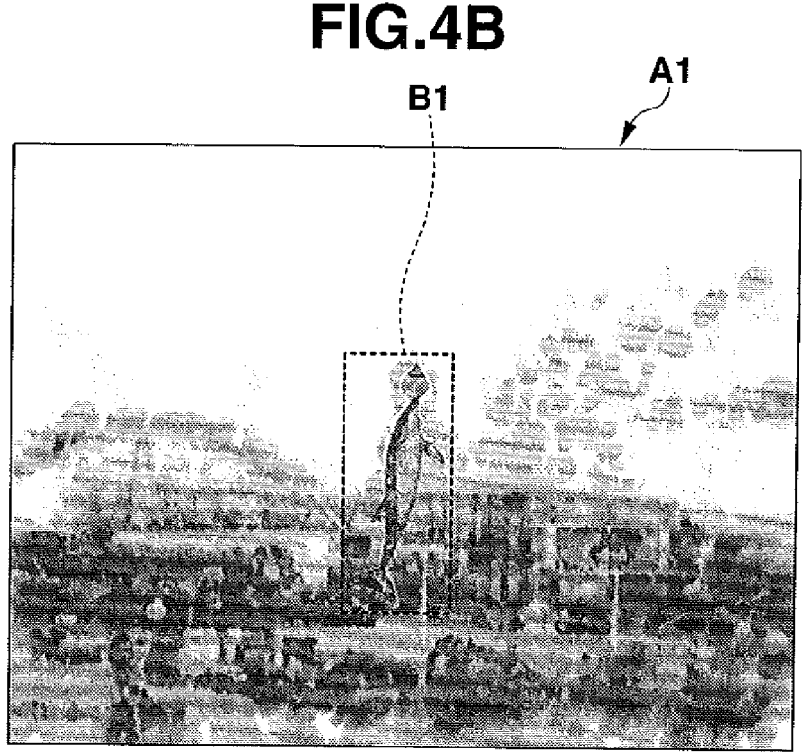
FIG. 4B is a diagram showing an example image that is the image of FIG. 4A having undergone painterly conversion.

For example, when an image represented by the image data 41 is the image a1 shown in FIG. 4A, if the ratio of a region B1 representing a main-object image piece relative to the whole image a1 is less than a predetermined threshold (e.g., 10%), the painterly conversion unit 400 converts the main-object image piece and a background image piece into painterly images with the first touch and the second touch, respectively. That is, as shown in FIG. 4B, the image a1 is converted into an image A1 having the main-object image piece with a finer touch than that of the background image piece. The image outputting unit 500 outputs the painterly image A1.

Figure 5A:
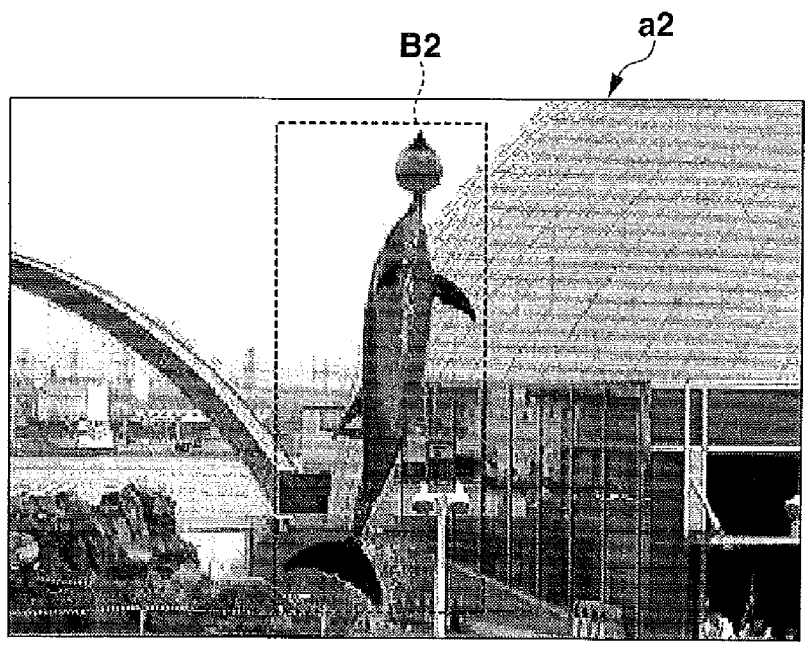
FIG. 5A is a diagram showing an example image where a main-object image piece occupies a large region.
Figure 5B:
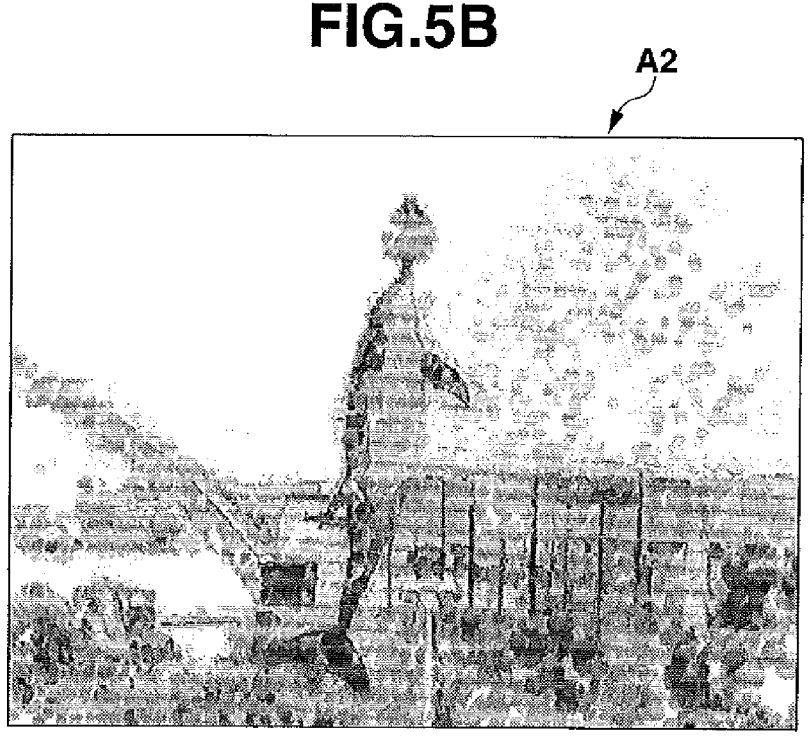
FIG. 5B is a diagram showing an example image that is the image of FIG. 5A having undergone painterly conversion.

Moreover, for example, when an image represented by the image data 41 is an image a2 shown in FIG. 5A, if the ratio of a region B2 representing a main-object image piece relative to the whole image a2 is equal to or larger than the threshold (e.g., 10%), the painterly conversion unit 400 converts the whole image a2 into a painterly image with the third touch. That is, as shown in FIG. 5B, the image a2 is converted into a painterly image A2 having the main-object image piece and the background image piece with the same roughness of touch. The image outputting unit 500 outputs the painterly image A2.

Figure 6:
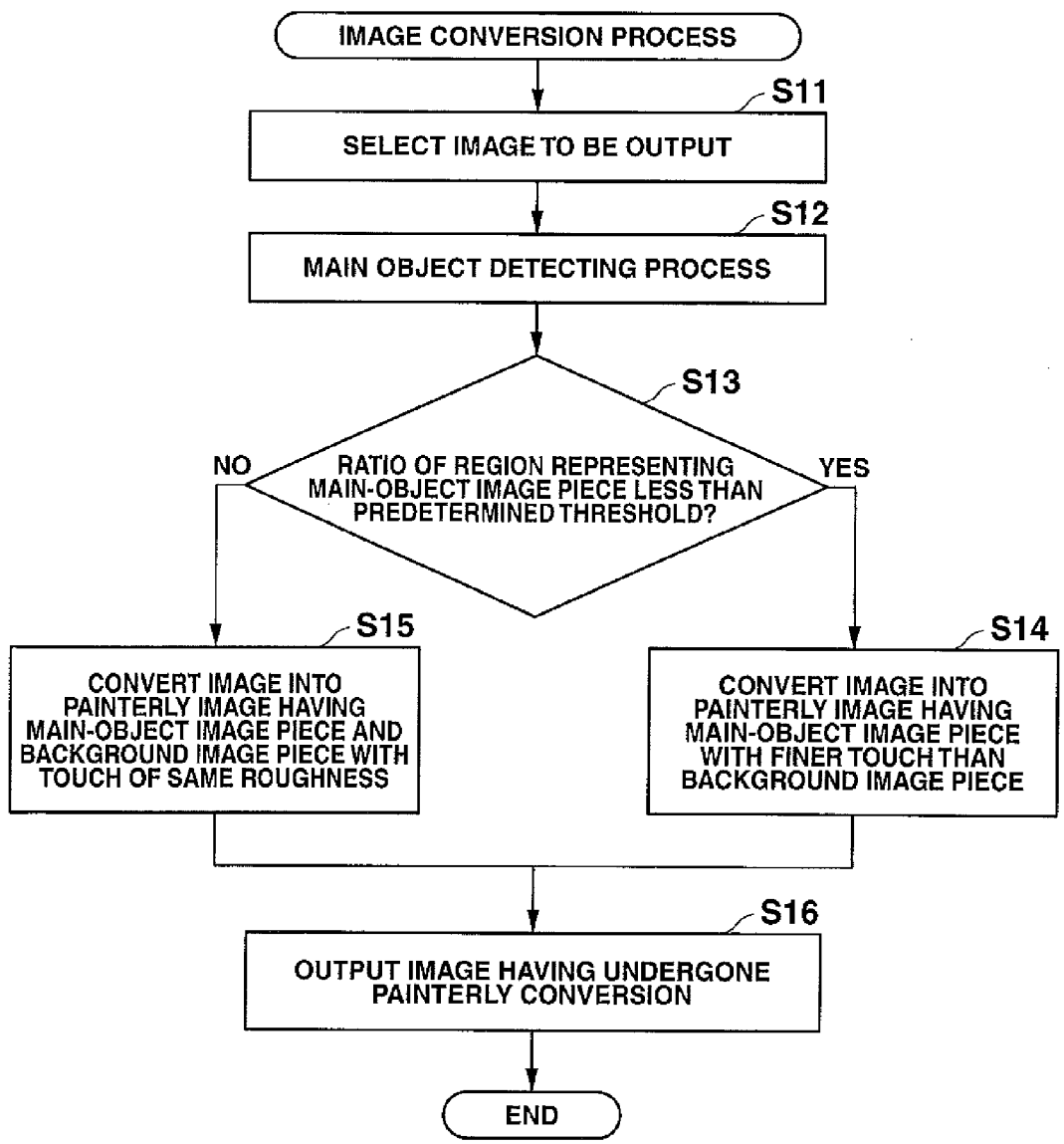
FIG. 6 is a flowchart showing an example flow of an image conversion process according to the first embodiment of the present invention.

Next, an explanation will be given of an operation of the image processing device 1 with the above-explained configuration according to the first embodiment with reference to the drawings. FIG. 6 is a flowchart showing an example flow of the image conversion process by the image processing device 1 of the first embodiment.

The image conversion process is actually executed when the CPU 10 reads the program 21 that is stored in the ROM 20 beforehand and runs such a program.

For example, the user operates the input device 50, which triggers to image processing device 1 of the first embodiment to start executing the image conversion process shown in FIG. 6.

First, the image data reading unit 200 selects an image to be output depending on an operation given by the user (step S11). For example, with the display device 60 displaying thumbnails (images scaled down in order to improve the visibility) of images represented by respective pieces of image data 41, the image to be output is selected based on an operation given by the user through the input device 50. When an image is selected by the user, the image data reading unit 200 reads the selected image data 41 from the image data memory unit 100.

Next, the main object detecting unit 300 performs the main object detecting process on the image selected in the step S11 (step S12). That is, the main object detecting unit 300 detects a main-object image piece from the image represented by the image data 41.

Figure 3B:
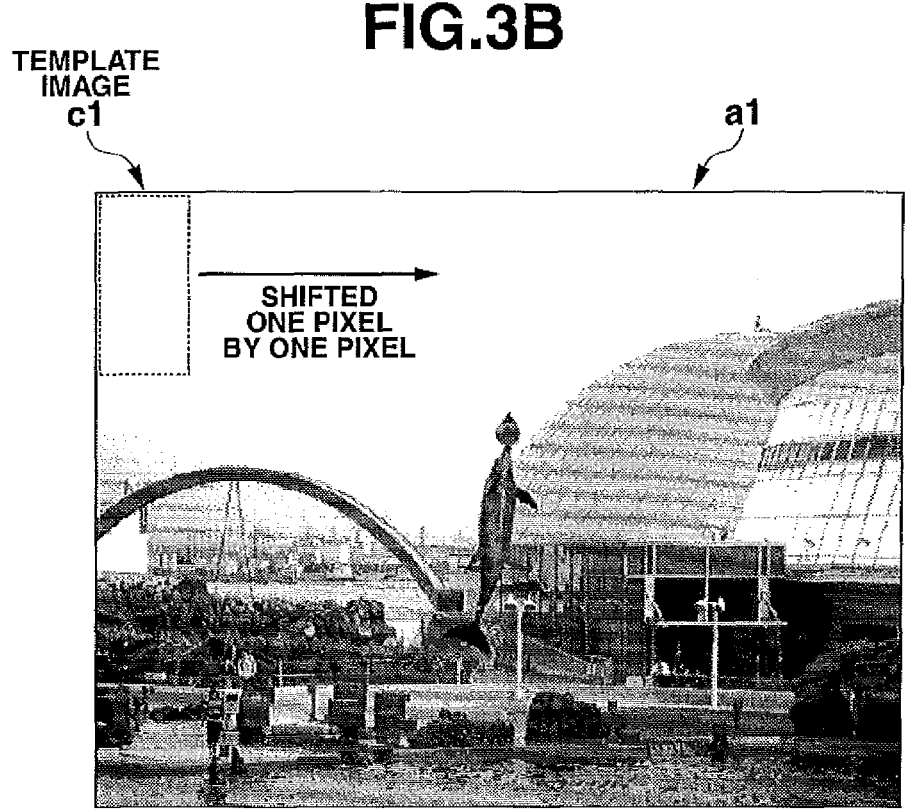
FIG. 3B is a diagram for explaining how to detect an arbitrary main object other than a face.

More specifically, when an image represented by the image data 41 is the image a1 shown in FIG. 3B which includes a "dolphin" as a main object, for example, the main object detecting unit 300 compares the dolphin template image c1 stored in the ROM 20 beforehand with an image in the focused region in the image a1, and calculates the similarity therebetween. Based on the calculated similarity, the main object detecting unit 300 detects whether or not a dolphin is contained in the focused region. Calculation of the similarity is carried out by extracting the feature amount (e.g., a contour of a general dolphin) effective for identifying whether or not a dolphin is contained. Moreover, the whole image a1 is scaled down (enlarged) at a certain rate, and the detecting process of a region containing a dolphin is likewise performed on the scaled-down (enlarged) image, thereby detecting an image in the region containing the dolphin as a main-object image piece.

Next, the painterly conversion unit 400 determines whether or not the ratio of the region representing the main-object image piece detected in the step S12 relative to the whole image represented by the image data 41 is less than the predetermined threshold (step S13).

More specifically, when the main object detecting unit 300 detects the region B1 as the region representing the main-object image piece in the image a1 shown in FIG. 4A, the painterly conversion unit 400 calculates the ratio of the number of pixels in the region B1 relative to the number of pixels in the image a1. Next, the painterly conversion unit 400 determines whether or not the calculated ratio is less than the predetermined threshold (e.g., 10%).

Next, when determining that the ratio of the region representing the main-object image piece is less than the predetermined threshold (step S13: YES), the painterly conversion unit 400 converts an image into a painterly image having the main-object image piece with a finer touch than that of the background image piece (step S14).

More specifically, when determining in the step S13 that the ratio of the region B1 representing the main-object image piece relative to the image a1 shown in FIG. 4A is less than the predetermined threshold (e.g., 10%), the painterly conversion unit 400 performs filter operation on the main-object image piece in the region B1 with the parameters set for the first touch. Moreover, the painterly conversion unit 400 performs filter operation on the background image piece in the regions other than the region B1 with the parameters set for the second touch rougher than the first touch. This enables the painterly conversion unit 400 to convert the image a1 into the painterly image A1 having the main-object image piece with a finer touch than that of the background image piece shown in FIG. 4B.

Moreover, when determining that the ratio of the region representing the main-object image piece is not less than the predetermined threshold, i.e., such a ratio is equal to or larger than the predetermined threshold (step S13: NO), the painterly conversion unit 400 converts the image into a painterly image having the main-object image piece and the background image piece with the same touch (step S15).

More specifically, when it is determined in the step S13 that the ratio of the region B1 representing the main-object image piece relative to the image a2 shown in FIG. 5A is equal to or larger than the predetermined threshold (e.g., 10%), the painterly conversion unit 400 performs filter operation on the image a2 with parameters set as the third touch. Accordingly, the painterly conversion unit 400 converts the image a2 into the painterly image A2 with the main-object image piece and the background image piece having the same roughness of touch.

The image outputting unit 500 outputs the image having undergone painterly conversion by the painterly conversion unit 400 in the step S14 or the step S15 (step S16). Next, the image outputting unit 500 ends the image conversion process.

More specifically, for example, because the image a1 where the ratio of the region B1 representing the main-object image piece is small as shown in FIG. 4A is converted into a painterly image having the main-object image piece with a finer touch than that of the background image piece by the painterly conversion unit 400 (step S14 in FIG. 6), the image outputting unit 500 outputs the above-explained painterly image A1 shown in FIG. 4B.

Moreover, for example, because the image a2 where the ratio of the region B2 representing the main-object image piece is large as shown in FIG. 5A is converted into a painterly image having the main-object image piece and the background image piece with the same touch by the painterly conversion unit 400 (step S15 in FIG. 6), the image outputting unit 500 outputs the above-explained painterly image A2 shown in FIG. 5B.

As explained above, when the ratio of the region representing the main-object image piece relative to the whole image is small, the image processing device 1 of the first embodiment converts such an image into a painterly image having the main-object image piece with a finer touch than that of the background image piece. Moreover, when the ratio of the region representing the main-object image piece relative to the whole image is large, the image processing device 1 converts such an image into a painterly image having the main-object image piece and the background image piece with the same roughness of touch. Therefore, the image processing device 1 can convert an image into a painterly image in accordance with the way the main-object image piece is present, i.e., in accordance with the size of the main-object image piece.

Moreover, when the ratio of the region representing the main-object image piece relative to the whole image is small, the image processing device 1 converts such an image into a painterly image having the main-object image piece with a finer touch than that of the background image piece, so that the main-object image piece can be emphasized without being buried in the background image piece.

First Modified Example of First Embodiment

In the first embodiment, when the ratio of the region representing the main-object image piece relative to the whole image is less than the predetermined threshold, the painterly conversion unit 400 converts such an image into a painterly image having the main-object image piece with a finer touch than that of the background image piece. However, the painterly conversion unit 400 may convert both main-object image piece and background image piece, i.e., the whole image into a painterly image with a fine touch.

As a first modified example of the first embodiment, an explanation will be below given of the image processing device 1 that converts, when the ratio of the region representing the main-object image piece relative to the whole image represented by image data is less than the predetermined threshold, such a whole image into a painterly image with a fine touch.

Figure 7:
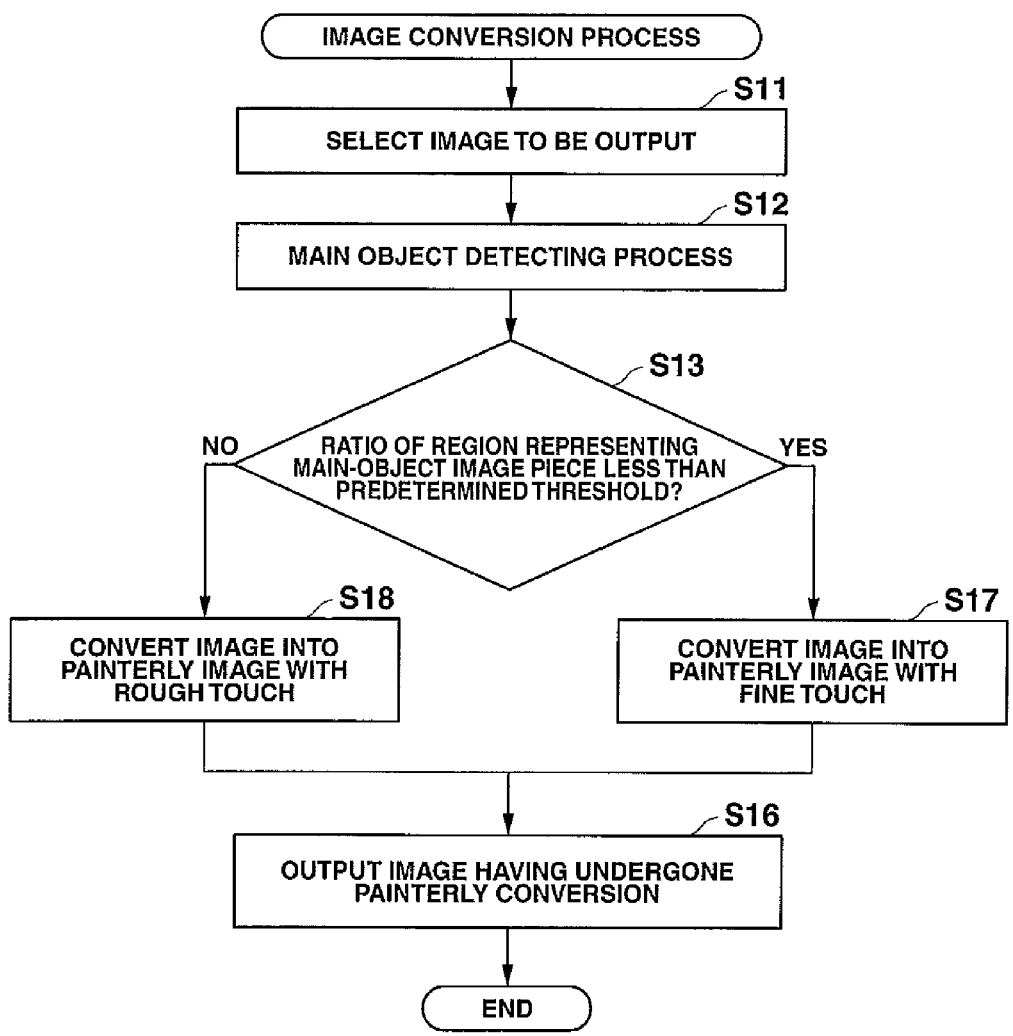
FIG. 7 is a flowchart showing an example flow of an image conversion process according to a first modified example of the first embodiment of the present invention.

More specifically, the image processing device 1 of the first modified example of the first embodiment executes an image conversion process shown in FIG. 7. In this image conversion process, the same step as that of the image conversion process shown in FIG. 6 is denoted by the same reference numeral.

In a step S17, the painterly conversion unit 400 converts the whole image into a painterly image with a fine touch. For example, in the case of the image a1 represented by the image data 41 and shown in FIG. 4A, when determining that the ratio of the region B1 representing the main-object image piece is less than the predetermined threshold (e.g., 10%) (step S13: YES in FIG. 7), the painterly conversion unit 400 converts the whole image a1 into a painterly image with the touch of the predetermined roughness (the first touch). More specifically, like the painterly conversion unit 400 of the first embodiment, the painterly conversion unit 400 performs filter operation on the image a1 with parameters corresponding to the first touch being set, thereby converting the image a1 into a painterly image.

Figure 8:
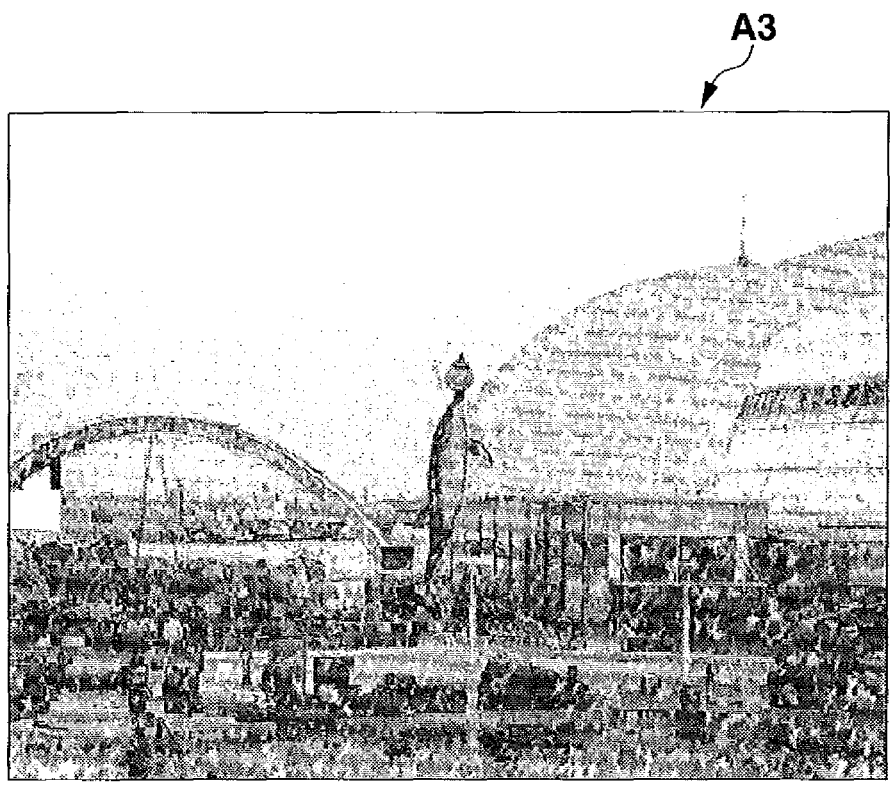
FIG. 8 is a diagram showing an example image generated by performing painterly conversion on an image where a main-object image piece occupies a small region.

Next, in the step S16 in FIG. 7, the image outputting unit 500 outputs an image A3 generated by converting the whole image a1 into a painterly image with a fine touch as shown in FIG. 8.

In a step S18, the painterly conversion unit 400 converts the whole image into a painterly image with a rough touch. For example, in the case of the image a2 represented by the image data 41 and shown in FIG. 5A, when determining that the ratio of the region B2 representing the main-object image piece is not less than the predetermined threshold (e.g., 10%), i.e., is equal to or larger than the threshold (step S13: NO in FIG. 7), the painterly conversion unit 400 converts the whole image a2 into a painterly image with the touch of the predetermined roughness (the second touch) rougher than the first touch. More specifically, like the painterly conversion unit 400 of the first embodiment, the painterly conversion unit 400 performs filter operation on the image a2 with parameters corresponding to the second touch being set, thereby converting the image a2 into a painterly image.

In the step S16 in FIG. 7, the image outputting unit 500 outputs an image A2 generated by converting the whole image a2 into a painterly image with the rough touch as shown in FIG. 5B.

As explained above, the image processing device 1 of the first modified example of the first embodiment converts, when the ratio of the region representing the main-object image piece relative to the whole image is small, the whole image into a painterly image with a fine touch. Moreover, when the ratio of the region representing the main-object image piece relative to the whole image is large, the image processing device 1 converts the whole image into a painterly image with a rough touch. Therefore, the image processing device 1 can convert an image into a painterly image in accordance with the way the main-object image piece is present, i.e., in accordance with the size of the main-object image piece.

Moreover, when the ratio of the region representing the main-object image piece relative to the whole image is small, a painterly image having undergone image conversion is represented with a fine touch, so that the image processing device 1 of the first modified example of the first embodiment can prevent the main-object image piece from being buried in the background image piece.

Second Modified Example of First Embodiment

In the first embodiment, when the ratio of the region representing the main-object image piece relative to the whole image is less than the predetermined threshold the painterly conversion unit 400 converts the image into a painterly image having the main-object image piece with a finer tough than that of the background image piece. However, the painterly conversion unit 400 may convert an image into a painterly image after a trimming is performed on the image so that the ratio of the region representing the main-object image piece becomes large.

As a second modified example of the first embodiment, an explanation will be given of the image processing device 1 that performs, when the ratio of the region representing the main-object image piece relative to the whole image represented by image data is less than the predetermined threshold, trimming on an image so that the ratio of the region representing the main-object image piece becomes large, and converts the trimmed image into a painterly image.

More specifically, the image processing device 1 of the second modified example of the first embodiment executes an image conversion process as shown in FIG. 9. In this image conversion process, the same step as that of the image conversion process shown in FIG. 6 is denoted by the same reference numeral.

In a step S19, the painterly conversion unit 400 performs trimming on an image represented by the image data 41 so that the ratio of the region representing the main-object image piece becomes a predetermined ratio.

For example, an explanation will be given of a case in which an image represented by the image data 41 is an image a1 shown in FIG. 10A. When the ratio of a region B1 representing the main-object image piece in the image a1 is less than a predetermined threshold (e.g., 10%), the painterly conversion unit 400 specifies a trimming region D1 where the region B1 has a predetermined ratio (e.g., 20%) to the trimming region D1. The painterly conversion unit 400 cuts out an image piece in the specified trimming region D1 from the image a1, and enlarges the cut image so as to have the same size as that of the image a1 (the original image before cut out). An image a4 cut out and enlarged in this fashion is shown in FIG. 10B.

The predetermined ratio of the region representing the main-object image piece relative to the trimming region may be specified beforehand by the user, or may be set as a fixed value.

In a step S20, the painterly conversion unit 400 converts an image represented by the image data 41 or the image having undergone trimming in the step S19 into a painterly image with a predetermined roughness of the touch.

Figure 10A:
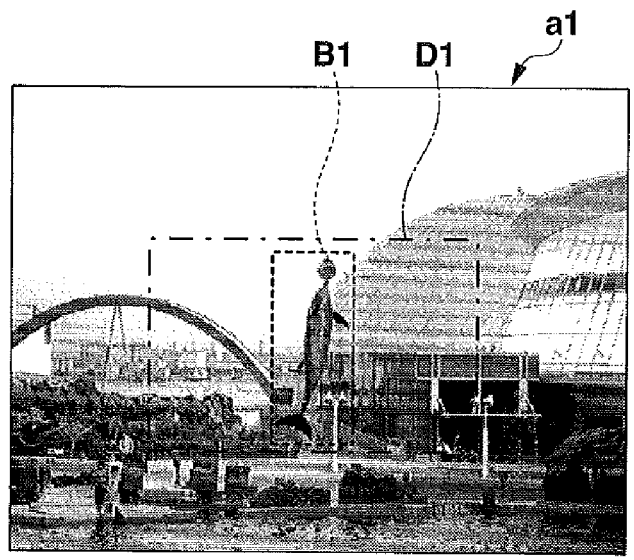
FIG. 10A is a diagram showing an example image where a main-object image piece occupies a small region.
Figure 10B:
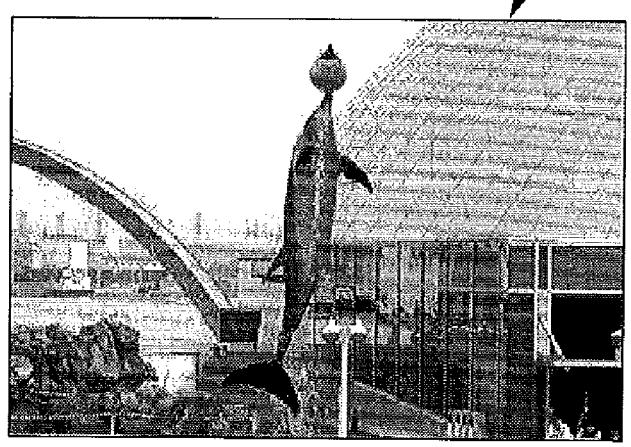
FIG. 10B is a diagram showing an example image that is the image of FIG. 10A having undergone trimming.
Figure 10C:
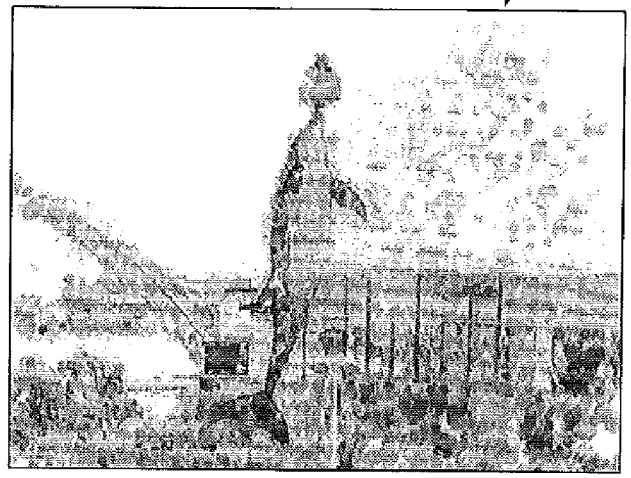
FIG. 10C is a diagram showing an example image that is the image of FIG. 10B having undergone painterly conversion.

For example, if the image represented by the image data 41 is the image a1 shown in FIG. 10A, when determining that the ratio of the region B1 representing the main-object image piece is less than the predetermined threshold (e.g., 10%) (step S13: YES in FIG. 9), the painterly conversion unit 400 converts an image a4 (see FIG. 10B) having undergone trimming in the step S19 into a painterly image A4 (see FIG. 10C) with a predetermined roughness of the touch.

Moreover, if the image represented by the image data 41 is the image a2 shown in FIG. 5A, when determining that the ratio of the region B2 representing the main-object image piece is not less than the predetermined threshold (e.g., 10%) (step S13: NO in FIG. 9), the painterly conversion unit 400 converts the image a2 into a painterly image (see FIG. 5B) with a predetermined roughness of the touch.

More specifically, the painterly conversion unit 400 performs filter operation on the image a1 or the image a2 with parameters corresponding to the predetermined roughness of the touch being set like the painterly conversion unit 400 of the first embodiment, thereby converting such an image into a painterly image.

In the step S16 in FIG. 9, the image outputting unit 500 outputs an image converted into a painterly image in a step S20.

The roughness of the touch when the image is converted into a painterly image in the step S20 may be specified beforehand by the user, or may be a fixed value.

As explained above, the image processing device 1 of the second modified example of the first embodiment trims the image so that the ratio of the region representing the main-object image piece relative to the whole image becomes large when such a ratio is small, and then converts the image into a painterly image. Therefore, the image processing device 1 can convert an image into a painterly image in accordance with the way the main-object image piece is present, i.e., in accordance with the size of the main-object image piece.

Moreover, the image processing device 1 of the second modified example of the first embodiment trims the image so that the region representing the main-object image piece becomes large when the ratio of such a region relative to the whole image is small, and then converts the trimmed image into a painterly image, thereby making the main-object image piece emphasized.

Third Modified Example of First Embodiment

In the second modified example of the first embodiment, the painterly conversion unit 400 trims the image so that the ratio of the region representing the main-object image piece relative to the whole image becomes large when the ratio of such a region is less than the predetermined threshold, and then converts the trimmed image into a painterly image. However, the painterly conversion unit 400 may perform trimming on plural trimming regions where the ratio of the region representing the main-object image piece differs, respectively. Regarding the plural images generated by performing trimming on plural trimming regions, the smaller the ratio of the region representing the main-object image piece is, the liner the touch becomes when each image is converted into a painterly image. The plural images converted into painterly images may be successively output like a slide show in an order that the ratio of the region representing the main-object image piece is small.

As a third modified example of the first embodiment, an explanation will be below given of the image processing device 1 which specifies plural trimming regions where the ratio of the region representing the main-object image piece relative to the whole image represented by image data differs, respectively, when the ratio of such a region representing the main-object image piece is less than the predetermined threshold, performs trimming on such plural trimming regions, converts each trimmed image in such a way that the smaller the ratio of the region representing the main-object image piece is, the finer the touch becomes when each trimmed image is converted into a painterly image, and the converted images are successively output in an order that the ratio of the region representing the main-object image piece is small.

More specifically, the image processing device 1 of the third modified example of the first embodiment executes an image conversion process shown in FIG. 11. In this image conversion process, the same step as that of the image conversion process shown in FIG. 9 is denoted by the same reference numeral.

Figure 12:
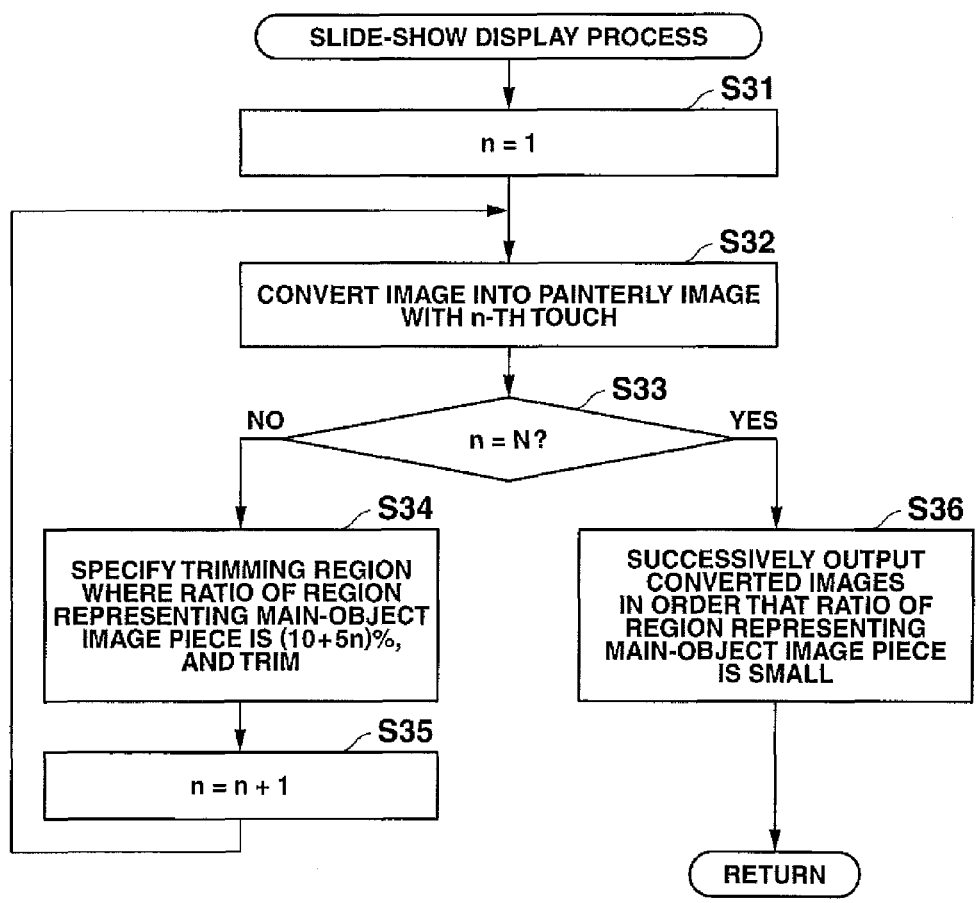
FIG. 12 is a flowchart showing an example flow of a slideshow display process according to the second modified example of the first embodiment of the present invention.

In a step S21, the painterly conversion unit 400 executes a slide-show display process shown in FIG. 12. An explanation will now be given of the slide-show display process with reference to the flowchart of FIG. 12.

In the following process, it is presumed that, as the touch when an image is converted into a painterly image, the first touch, the second touch, and Nth touch are set beforehand in an order that the touch is fine. N is a total number of painterly images to be successively output.

First, the painterly conversion unit 400 sets a count n for counting the number of images having undergone painterly conversion to be n=1 (step S31). Moreover, an image represented by the image data 41 is stored in the RAM 30 as an image to be converted.

Next, the painterly conversion unit 400 converts an image to be converted and stored in the RAM 30 into a painterly image with an nth touch (step S32). More specifically, like the painterly conversion unit 400 of the first embodiment, the painterly conversion unit 400 performs filter operation on the image to be converted with parameters corresponding to the nth touch being set, thereby converting such an image into a painterly image. The converted image is stored in the RAM 30 as a painterly image with an nth touch.

Figure 13A:
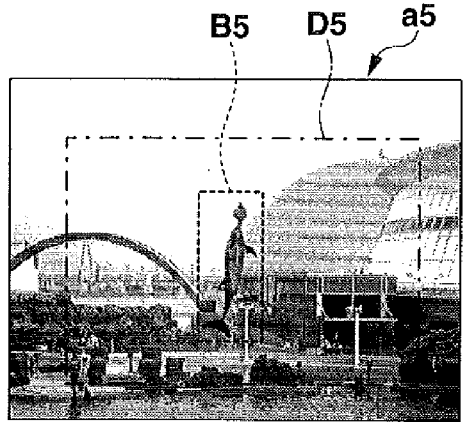
FIG. 13A is a diagram showing an example image where a main-object image piece occupies a small region.

For example, when the image represented by the image data 41 is an image a5 shown in FIG. 13A, at n=1, the RAM 30 stores the image a5 as the image to be converted. Accordingly, the painterly conversion unit 400 converts the image a5 into a painterly image A5 shown in FIG. 13D with the first touch. Next, the converted image A5 is stored in the RAM 30 as a painterly image with the first touch.

Next, the painterly conversion unit 400 determines whether or not the counter n is equal to N that is the total number of painterly images to be successively output (step S33).

When determining that the counter n is not equal to N (step S33: NO), the painterly conversion unit 400 specifies a trimming region where the ratio of the region representing the main-object image piece to the trimming region is (10+5n) % in the image to be converted stored in the RAM 30, and performs trimming on the image piece in the trimming region (step S34). The painterly conversion unit 400 stores the trimmed image in the RAM 30 as an image to be converted.

An explanation will be given of an operation when, for example, n=1 in a case in which N is set to be 3 beforehand. The painterly conversion unit 400 specifies a trimming region D5 where the ratio of the region B5 representing the main-object image piece to the trimming region D5 is 15% in the image a5 shown in FIG. 13A that is the image to be converted and stored in the RAM 30. Next, the painterly conversion unit 400 cuts out the image piece in the trimming region D5, and enlarges the cut image so as to have the same size as that of the image a5 (the image before cutout). An image a6 that is cut out and enlarged in this fashion is shown in FIG. 13B. The painterly conversion unit 400 stores the trimmed image a6 in the RAM 30 as an image to be converted.

Next, the painterly conversion unit 400 updates the counter n to be n+1 (step S35). Thereafter, the process returns to the step S32.

Therefore, the painterly conversion unit 400 repeats executing the process from the step S32 to the step S35 until the counter n reaches N, i.e., until the number of painterly images stored in the RAM 30 reaches N that is the total number of the painterly image to be successively output.

Figure 13D:
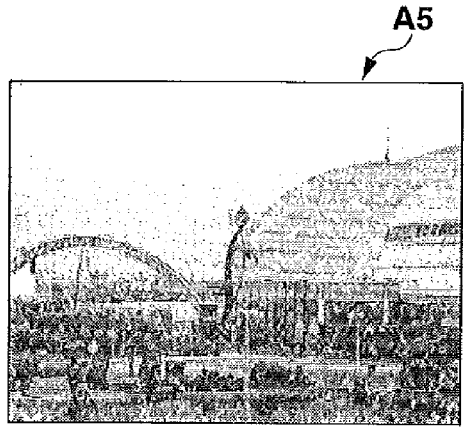
FIG. 13D is a diagram showing an example image that is the image of FIG. 13A having undergone painterly conversion.
Figure 13B:
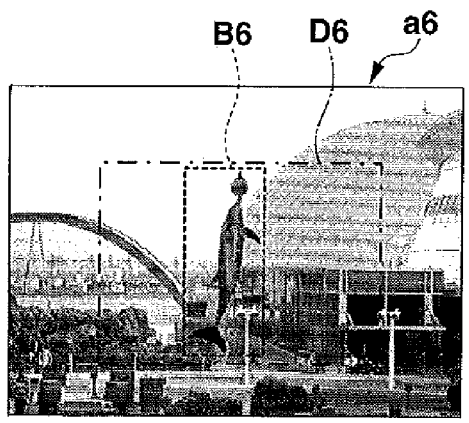
FIG. 13B is a diagram showing an example image that is the image of FIG. 13A having undergone trimming.

For example, in a case in which an image represented by the image data 41 is the image a5 shown in FIG. 13A, when N is set to be 3 beforehand, at n=1, the painterly conversion unit 400 converts the image a5 into the painterly image A5 with the first touch shown in FIG. 13D. Moreover, at n=2, the painterly conversion unit 400 converts an image a6 shown in FIG. 13B into a painterly image A6 with the second touch shown in FIG. 13E. Moreover, the painterly conversion unit 400 specifies a trimming region D6 where the ratio of a region B6 representing the main-object image piece is 20% in the image a6 shown in FIG. 13B. An image a7 that is cut out and enlarged from the trimming region D6 is shown in FIG. 13C. Furthermore, at n=3, the painterly conversion unit 400 converts the image a7 shown in FIG. 13C into a painterly image A7 shown in FIG. 13F with the third touch. The painterly image A5 with the first touch, the painterly image A6 with the second touch, and the painterly image A7 with the third touch converted in this fashion are stored in the RAM 30.

When it is determined that the counter n is equal to N (step S33: YES), i.e., when the number of painterly images stored in the RAM 30 reaches N that is the total number of painterly images to be successively output, the image outputting unit 500 successively outputs painterly images stored in the RAM 30 in an order that the ratio of the region representing the main-object image piece is small (step S36).

Figure 13E:
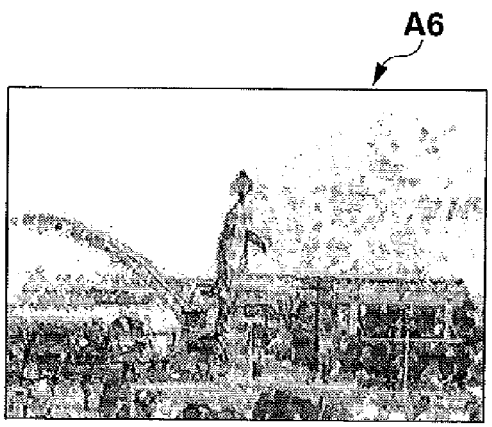
FIG. 13E is a diagram showing an example image that is the image of FIG. 13B having undergone painterly conversion.
Figure 13C:
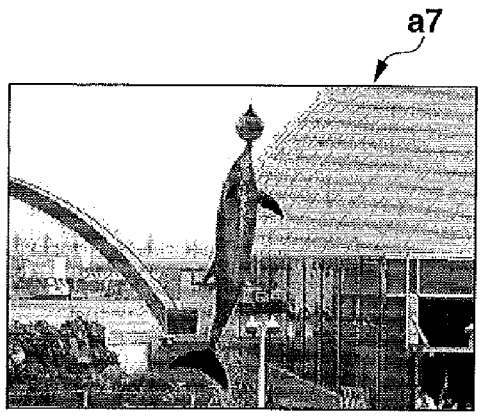
FIG. 13C is a diagram showing an example image that is the image of FIG. 13A having undergone trimming.
Figure 13F:
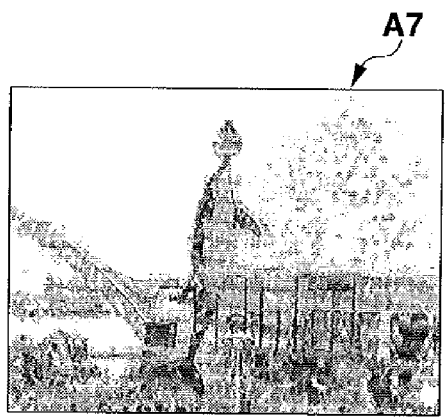
FIG. 13F is a diagram showing an example image that is the image of FIG. 13C having undergone painterly conversion.

When the RAM 30 stores, for example, the painterly image A5 with the first touch, the painterly image A6 with the second touch, and the painterly image A7 with the third touch as shown in FIGS. 13D to 13F, the order that the ratio of the region representing the main-object image piece is small is the order of the touch being fine, i.e., the order of A5, A6, and A7. Therefore, the image outputting unit 500 outputs the painterly images so that each painterly image is displayed for a predetermined time (e.g., for three seconds) in the order of A5, A6, and A7. Returning now to FIG. 11, the image conversion process is terminated.

In the step S13 in FIG. 11, when determining that the ratio of the region representing the main-object image piece is not less than the predetermined threshold, i.e., is equal to or larger than the predetermined threshold (step S13: NO), the painterly conversion unit 400 converts an image represented by the image data 41 into a painterly image with a predetermined roughness of the touch (step S22). Next, the image outputting unit 500 outputs an image convened into a painterly image in the step S22 (step S23).

The total number N of the painterly images to be successively output and the roughness of the touch when the image is converted into a painterly image in the step S22 may be set beforehand by the user or may be a fixed value.

In the step S34 in FIG. 12, the trimming region is specified so that the ratio of the region representing the main-object image piece becomes (10+5n) %, but how to specify the trimming region is not limited to this scheme. As long as the each ratio of the region representing the main-object image piece relative to trimming region becomes different, how to specify the trimming region is optional. For example, plural different values may be stored in the ROM 20 in association with n. Thereafter, in the step S34, a value corresponding to n may be read out, and the trimming region may be specified in such a way that the region representing the main-object image piece has the ratio that is the read value.

As explained above, the image processing device 1 of the third modified example of the first embodiment converts, when the ratio of the region representing the main-object image piece relative to the whole image is small, the image into plural painterly images so that the smaller the ratio of the region representing the main-object image piece is, the finer the touch becomes. Therefore, the image processing device 1 can convert an image into a painterly image in accordance with the way the main object is present, i.e., in accordance with the size of the main-object image piece.

Moreover, the image processing device 1 of the third modified example of the first embodiment successively outputs plural images having undergone painterly conversion in an order that the ratio of the region representing the main-object image piece is small. Therefore, by making the image zoomed toward the main-object image piece and by making the touch rougher, it is possible for the image processing device 1 to prevent the main-object image piece from being buried in the background image piece, and to display the image with the main-object image piece made further emphasized.

Second Embodiment

In the first embodiment, an explanation was given of a case in which an image is converted into a painterly image based on the ratio of the region representing the main-object image piece relative to the whole image. However, such an image may be converted in a painterly image in such a way that an image piece in a blurred region and an image piece in a non-blurred region have touch of different roughness. This makes it possible for the image processing device to convert an image into a painterly image in accordance with the way the main-object image piece is present, i.e., in accordance with the blurring level of the main-object image piece.

As a second embodiment of the present invention, an explanation will be below given of an image processing device 1 that converts an image represented by the image data 41 into a painterly image in such a way that an image piece in a blurred region and an image piece in a non-blurred region have touch of different roughness. The difference of the image processing device 1 of the second embodiment from that of the first embodiment will be explained below in detail. The image processing device 1 of the second embodiment has the same hardware configuration as that of the first embodiment (see FIG. 1), so that the same element will be denoted by the same reference numeral and the duplicated detailed explanation thereof will be skipped.

Figure 14:
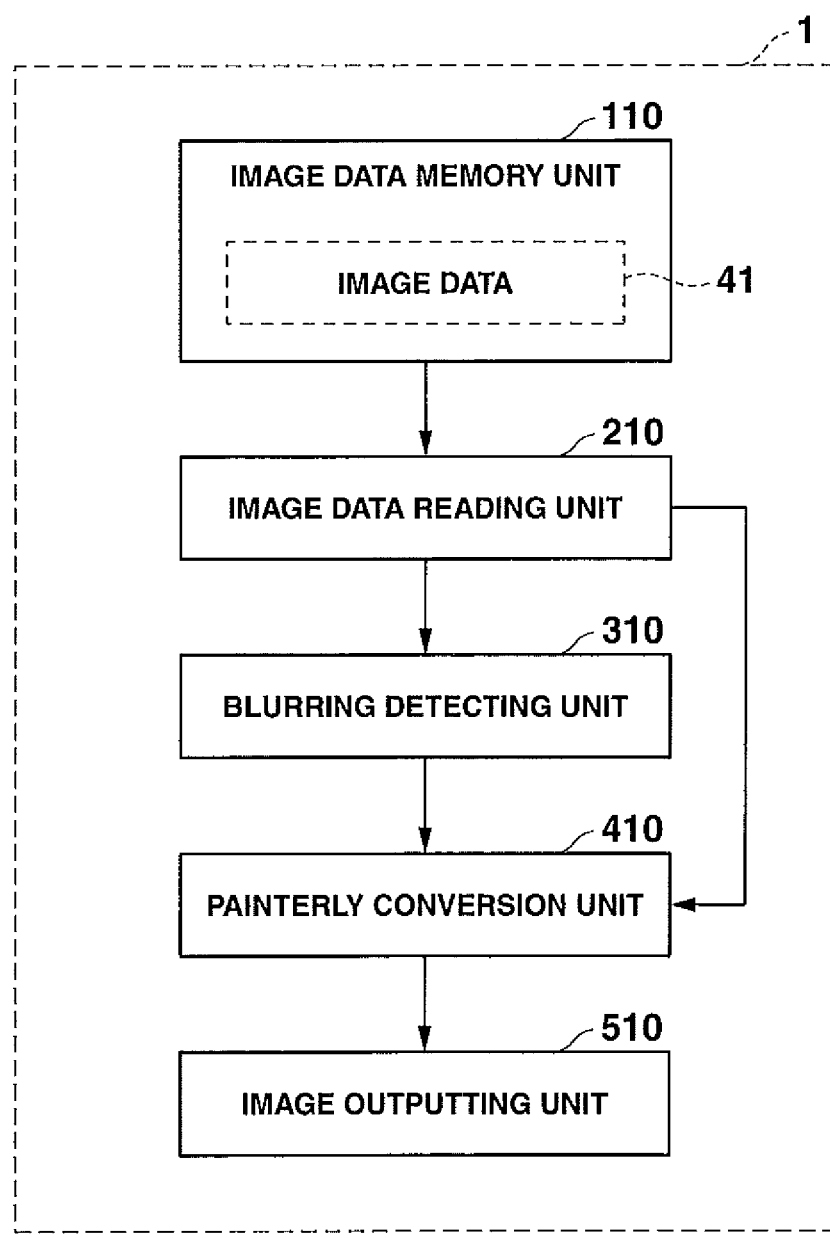
FIG. 14 is a block diagram showing a configuration of an image processing device according to a second embodiment of the present invention.

FIG. 14 is a block diagram showing a general configuration of the image processing device according to the second embodiment of the present invention.

As shown in FIG. 14, the image processing device 1 includes an image data memory unit 110, an image data reading unit 210, a blurring detecting unit 310, a painterly conversion unit 410, and an image outputting unit 510.

The image data memory unit 110 comprises the above-explained external memory device 40, and stores the image data 41. That is, the image data memory unit 110 stores the above-explained image data 41 that represents an image of a person, a scenery, etc.

The image data reading unit 210 comprises, for example, the above-explained CPU 10 (more specifically, the CPU that operates in accordance with the driver program that controls the external memory device 40), and reads the image data stored in the image data memory unit 110 as needed. For example, the image data reading unit 210 reads pieces of image data 41 stored in the image data memory unit 110 in a predetermined order or at random. Moreover, the image data reading unit 210 may read image data 41 selected by the user from the image data memory unit 110.

The blurring detecting unit 310 comprises, for example, the above-explained CPU 10 (more specifically, the CPU 10 that executes a blurring detecting process to be discussed later), and detects a blurred region in an image represented by the image data 41 read by the image data reading unit 210.

A specific example of how the blurring detecting unit 310 detects a blurred region will be explained below. The blurring detecting unit 310 divides an image represented by the image data 41 into plural tiny regions for example, and detects, for each tiny region, whether or not there is a blurring. As an example, the blurring detecting unit 310 detects whether or not there is a blurring through a scheme disclosed in Unexamined Japanese Patent Application KOKAI Publication No. 2007-295181. More specifically, a high-frequency component is extracted from each tiny region, and binarization is performed on the extracted high-frequency component at a predetermined threshold, thereby detecting an edge pixel. An edge level is obtained based on the number of detected edge pixels. Next, it is determined whether or not there is a blurring in each tiny region based on the obtained edge level. Thereafter, the blurring detecting unit 310 detects, as blurred regions, all tiny regions determined that there is a blurring.

The painterly conversion unit 410 comprises, for example, the above-explained CPU 10 (more specifically, the CPU 10 that executes a painterly conversion process to be discussed later), and converts an image into a painterly image in such a way that an image piece in the blurred region detected by the blurring detecting unit 310 and images in the regions other than the blurred region in the whole image have touch of different roughness.

For example, the painterly conversion unit 410 performs painterly conversion so that the image piece in the blurred region detected by the blurring detecting unit 310 is converted at a touch of predetermined roughness (the first touch) and images of regions other than the blurred region in the whole image represented by the image data 41, i.e., images of non-blurred regions are converted at a touch of predetermined roughness rougher than that of the first touch (the second touch).

More specifically, the painterly conversion unit 410 performs filter operation on the image piece in the blurred region and the image piece in the non-blurred region with parameters corresponding to the first touch and the second touch being set, respectively, like the painterly conversion unit 400 of the first embodiment, thereby converting an image into a painterly image.

Note that respective roughness of various touches (the first touch and the second touch) (parameters of respective filters) may be specified beforehand by the user or may be fixedly set. Moreover, the roughness of the first touch and that of the second touch are optional as long as the second touch is rougher.

The image outputting unit 510 comprises the above-explained display device 60, and outputs an image having undergone painterly conversion by the painterly conversion unit 410. That is, the image outputting unit 510 displays a painterly image.

For example, when images represented by pieces of the image data 41 are images a8, a9 shown in FIGS. 16A and 16B, the images a8, a9 are converted into painterly images A8, A9, respectively, having images in blurred regions E8, E9 with a fine touch and having images in non-blurred regions F8, F9 with a rough touch. The image outputting unit 510 outputs the images A8, A9 having undergone painterly conversion.

Figure 15:
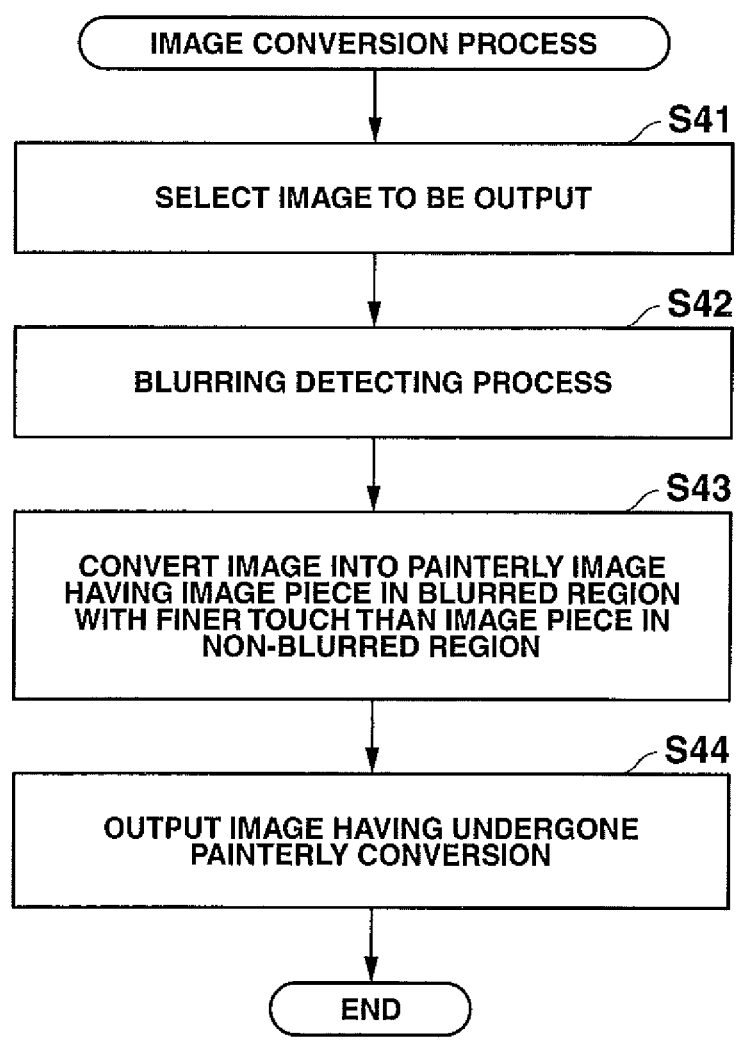
FIG. 15 is a flowchart showing an example flow of an image conversion process according to the second embodiment of the present invention.

Next, an explanation will be given of an operation by the image processing device 1 employing the above-explained configuration according to the second embodiment with reference to the accompanying drawing. FIG. 15 is a flowchart showing an example flow of an image conversion process by the image processing device 1 of the second embodiment of the present invention.

This image conversion process is executed in practice when the CPU 10 reads the program 21 stored in the ROM 20 and runs such a program.

An operation of the input device 50 given by the user triggers activation of the image conversion process shown in FIG. 15.

First, the image data reading unit 210 selects an image to be output in accordance with the operation given by the user (step S41). For example, with the display device 60 displaying thumbnail images (images scaled down so as to improve the visibility) for images represented by pieces of individual image data 41, an image to be output is selected based on the operation given by the user through the input device 50. When any one of the images is selected by the user, the image data reading unit 210 reads the selected image data 41 from the image data memory unit 110.

Next, the blurring detecting unit 310 executes a blurring detecting process on the image selected in the step S41 (step S42). That is, the blurring detecting unit 310 detects a blurred region in the image represented by the image data 41 as explained above.

Subsequently, the painterly conversion unit 410 converts the image piece in the blurred region and the image piece in the non-blurred region into painterly images, respectively, so that the image piece in the blurred region detected in the step S42 has a finer touch than that of the image piece in the non-blurred region (step S43). That is, the painterly conversion unit 410 converts the image piece in the blurred region detected by the blurring detecting unit 310 into painterly image with a first touch and the image piece in the region other than the blurred region in the whole image represented by the image data 41, i.e., the image piece in the non-blurred region into painterly image with the second touch that is rougher than the first touch.

More specifically, like the painterly conversion unit 400 of the first embodiment, the painterly conversion unit 410 performs filter operation on the image piece in the blurred region and the image piece in the non-blurred region with parameters corresponding to the first touch and the second touch, respectively, being set, thereby converting an image into a painterly image.

Respective roughness of various touches (the first touch and the second touch) (parameters of respective filters) may be specified beforehand by the user, or may be fixedly set. Moreover, the roughness of the first touch and that of the second touch are optional as long as the second touch is rougher.

Next, the image outputting, unit 510 outputs an image having undergone painterly conversion by the painterly conversion unit 410 (step S44). For example, when images represented by pieces of the image data 41 are the images a8, a9 shown in FIGS. 16A, 16B, the painterly conversion unit 410 converts such images into painterly images A8, A9 having the images in the blurred regions E8. E9 with a fine touch, and having the images in the non-blurred regions F8, F9 with a rough touch. Next, the image outputting unit 510 outputs images A8, A9 having undergone painterly conversion.

As explained above, according to the second embodiment, the image processing device 1 makes the touch of the image piece in the blurred region finer and makes the touch of the image piece in the non-blurred region rougher when converting an image into a painterly image.

For example, when the blurred region E8 shown in FIG. 16A is the region representing the main-object image piece, i.e., when the main-object image piece is blurred, an image is converted into the painterly image A8 in such a way that the touch of the main-object image piece becomes fine and the touch of the background image piece becomes rough. Moreover, for example, when the non-blurred region F9 shown in FIG. 16B is the region representing the main-object image piece, i.e., when the main-object image piece is not blurred, an image is converted into the painterly image A9 in such a way that the touch of the main-object image piece becomes rough and the touch of the background image piece becomes fine.

Therefore, the image processing device 1 of the second embodiment can convert an image into a painterly image in accordance with the way the main-object image piece is present, i.e., in accordance with the blurred level of the main-object image piece.

Moreover, when the main-object image piece is blurred, an image is converted into a painterly image having the main-object image piece with a fine touch and the background image piece with a rough touch, so that the main-object image piece can be emphasized in the image having undergone painterly conversion.

Modified Example of Second Embodiment

In the second embodiment, the explanation was given of the case in which the image piece in the blurred region and the image piece in the non-blurred region are converted into respective painterly images so that the image piece in the blurred region has a finer touch than that of the image piece in the non-blurred region. However, images may be converted into painterly images so that the image piece in the blurred region has a rougher touch than that of the image piece in the non-blurred region.

As a modified example of the second embodiment, an explanation will be given of an image processing device 1 that converts images into painterly images so that the image piece in the blurred region has a rougher touch than that of the image piece in the non-blurred region.

In the image processing device 1 of the modified example of the second embodiment, the painterly conversion unit 410 converts an image piece in the blurred region detected by the blurring detecting unit 310 into a painterly image with a predetermined roughness of a touch (a first touch) and converts an image piece in region other than the blurred region in the whole image represented by the image data 41, i.e., the image piece in the non-blurred region into painterly images with a predetermined roughness of a touch (a second touch) that is finer than the first touch unlike the painterly conversion unit 410 of the second embodiment.

More specifically, like the painterly conversion unit 400 of the first embodiment, the painterly conversion unit 410 performs filter operation on the image piece in the blurred region and the image piece in the non-blurred region with parameters corresponding to the first touch and the second touch, respectively, being set, thereby converting those images into painterly images.

Respective roughness of various touches (the first touch and the second touch) (parameters of respective filters) may be specified beforehand by the user, or may be fixedly set.

Moreover, the roughness of the first touch and that of the second touch are optional as long as the first touch is rougher.

Figure 17:
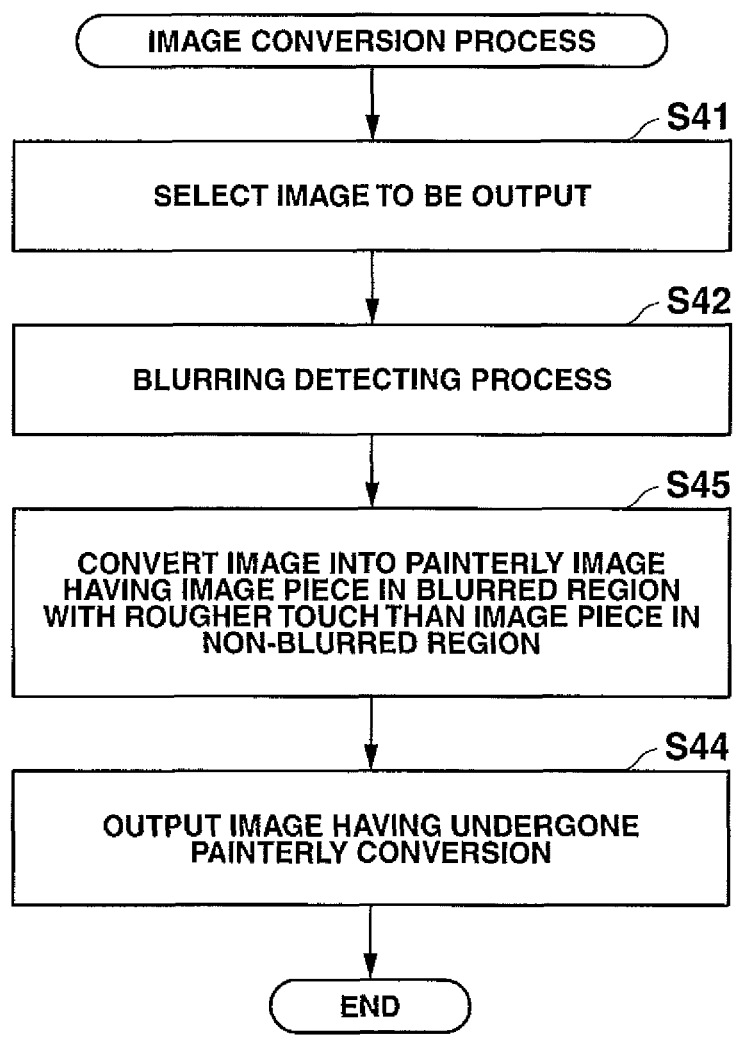
FIG. 17 is a flowchart showing an example flow of an image conversion process according to a modified example of the second embodiment of the present invention.

Next, an explanation will be given of an operation of the image processing device according to the modified example of the second embodiment with reference to the accompanying drawing. FIG. 17 is a flowchart showing an example flow of an image conversion process by the image processing device 1 of the modified example of the second embodiment. In this image conversion process, the same step as that of the image conversion process shown in FIG. 15 will be denoted by the same reference numeral, and the duplicated detailed explanation thereof will be skipped.

In a step S45, the painterly conversion unit 410 converts an image piece in the blurred region and an image piece in the non-blurred region into respective painterly images so that the image piece in the blurred region detected in the step S42 has a rougher touch than that of the image piece in the non-blurred region. That is, the painterly conversion unit 410 converts the image piece in the blurred region detected by the blurring detecting unit 310 into a painterly image with the first touch and converts the image in regions other than the blurred region in the whole image represented by the image data 41, i.e., the image piece in the non-blurred region into a painterly image with the second touch that is finer than the first touch.

More specifically, the painterly conversion unit 410 performs filter operation on the image piece in the blurred region and the image piece in the non-blurred region with parameters corresponding to the first touch and the second touch, respectively, being set, thereby converting those images into painterly images like the painterly conversion unit 400 of the first embodiment.

In a step S44, the image outputting unit 510 outputs the image having undergone painterly conversion by the painterly conversion unit 410. For example, when images represented by pieces of the image data 41 are images a10, all shown in FIGS. 18A and 18B, the painterly conversion unit 410 converts the images in the blurred regions E10, E11 into painterly images with a rough touch, and converts the images in the non-blurred regions F10, F11 into painterly images with a fine touch. The image outputting unit 510 outputs images A10, A11 having undergone painterly conversion.

As explained above, when converting an image into a painterly image, the image processing device 1 of the modified example of the second embodiment uses the image piece in the blurred region to have a rough touch and causes the image piece in the non-blurred region to have a fine touch.

When, for example, the blurred region E10 shown in FIG. 18A is the region representing the main-object image piece, i.e., when the main-object image piece is blurred, the image is converted into the painterly image A10 having the main-object image piece with a rough touch and having the background image piece with a fine touch. Moreover, when, for example, the non-blurred region F11 shown in FIG. 18B is the region representing the main-object image piece, i.e., when the main-object image piece is not blurred, the image is converted into the painterly image A11 having the main-object image piece with a fine touch and having the background image piece with a rough touch.

Accordingly, the image processing device 1 of the modified example of the second embodiment can convert an image into a painterly image in accordance with the way the main-object image piece is present, i.e., in accordance with the blurred level of the main-object image piece.

Moreover, the image processing device 1 of the modified example of the second embodiment converts an image into a painterly image so that the image piece in the blurred region has a rough touch and the image piece in the non-blurred region has a fine touch, thereby reflecting the blurred level of the image prior to the conversion.

The image processing devices 1 of the first embodiment, the second embodiment, and modified examples thereof can be realized by not only an exclusive device but also a general computer system. For example, when a program for executing the above-explained processes is installed in a computer including a network card or the like from a medium (a flexible disk, a CD-ROM, a DVD-ROM, etc.) storing such a program, the image processing device that executes the above-explained processes can be configured.

How to provide such a program to a computer optional. For example, such a program can be provided through a communication line, a communication network, a communication system, etc. As an example, such a program is posted on a bulletin board system (BBS) over a communication network, and is superimposed on a carrier wave and distributed over the network, enabling a computer to execute the above-explained processes.

According to each of the above-explained embodiments and modified examples, image processing in accordance with the way a main-object image piece is present is enabled.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. An image processing device comprising:
    a main object detecting unit that detects a main-object image piece from an image represented by image data; and
    a painterly conversion unit that converts the image into a painterly image based on a ratio of a region representing the main-object image piece to the whole image,
    wherein the painterly conversion unit:
        converts the main-object image piece into a painterly image piece by a first touch with a predetermined roughness and converts an image piece in a region other than the region representing the main-object image piece in the whole image into a painterly image piece by a second touch rougher than the first touch when the ratio of the region representing the main-object image piece to the whole image is less than a predetermined threshold; and
        converts the image into a painterly image by a third touch with a predetermined roughness when the ratio of the region representing the main-object image piece to the whole image is equal to or larger than the predetermined threshold.

2. An image processing device comprising:
    a main object detecting unit that detects a main-object image piece from an image represented by image data; and
    a painterly conversion unit that converts the image into a painterly image based on a ratio of a region representing the main-object image piece to the whole image,
    wherein the painterly conversion unit:
        converts the image into a painterly image by a first touch with a predetermined roughness when the ratio of the region representing the main-object image piece to the whole image is less than a predetermined threshold; and converts the image into a painterly image by a second touch rougher than the first touch when the ratio of the region representing the main-object image piece to the whole image is equal to or larger than the predetermined threshold.

3. An image processing device comprising:
a main object detecting unit that detects a main-object image piece from an image represented by image data; and
a painterly conversion unit that converts the image into a painterly image based on a ratio of a region representing the main-object image piece to the whole image,
wherein when the ratio of the region representing the main-object image piece to the whole image is less than a predetermined threshold, the painterly conversion unit (i) specifies within the whole image a trimming region including the region representing the main-object image piece, the region representing the main-object image piece having a predetermined ratio to the specified trimming region, (ii) cuts out an image piece in the specified trimming region, and (iii) converts the image piece into a painterly image by a touch with a predetermined roughness.

4. An image processing device comprising:
a main object detecting unit that detects a main-object image piece from an image represented by image data;
a painterly conversion unit that converts the image into a painterly image based on a ratio of a region representing the main-object image piece to the whole image; and
an image outputting unit that outputs the image having undergone painterly conversion by the painterly conversion unit,
wherein:
the painterly conversion unit, when the ratio of the region representing the main-object image piece to the whole image is less than a predetermined threshold, (i) specifies within the whole image a first trimming region including the region representing the main-object image piece, a ratio of the region representing the main-object image piece to the first trimming region being a first ratio, (ii) specifies a second trimming region including the region representing the main-object image piece, a ratio of the region representing the main-object image piece to the second trimming region being a second ratio different from the first ratio, (iii) cuts out respective image pieces in the first and second trimming regions from the whole image, and (iv) converts the cut images into respective painterly images so that the larger the ratio of the region representing the main-object image piece to each of the first and second trimming regions is, the rougher a touch of the converted image becomes, and
the image outputting unit successively outputs the images having undergone painterly conversion by the painterly conversion unit in each of the first and second trimming regions in an order that the ratio of the region representing the main-object image piece to each of the first and second trimming regions is small.

5. A non-transitory computer-readable storage medium having a program stored thereon that controls a computer to function as units comprising:
a main object detecting unit that detects a main-object image piece from an image represented by image data; and
a painterly conversion unit that converts the image into a painterly image based on a ratio of a region representing the main-object image piece to the whole image,
wherein the painterly conversion unit:
converts the main-object image piece into a painterly image piece by a first touch with a predetermined roughness and converts an image piece in a region other than the region representing the main-object image piece in the whole image into a painterly image piece by a second touch rougher than the first touch when the ratio of the region representing the main-object image piece to the whole image is less than a predetermined threshold; and
converts the image into a painterly image by a third touch with a predetermined roughness when the ratio of the region representing the main-object image piece to the whole image is equal to or larger than the predetermined threshold.

6. A non-transitory computer-readable storage medium having a program stored thereon that controls a computer to function as units comprising:
a main object detecting unit that detects a main-object image piece from an image represented by image data; and
a painterly conversion unit that converts the image into a painterly image based on a ratio of a region representing the main-object image piece to the whole image,
wherein the painterly conversion unit:
converts the image into a painterly image by a first touch with a predetermined roughness when the ratio of the region representing the main-object image piece to the whole image is less than a predetermined threshold; and
converts the image into a painterly image by a second touch rougher than the first touch when the ratio of the region representing the main-object image piece to the whole image is equal to or larger than the predetermined threshold.

7. A non-transitory computer-readable storage medium having a program stored thereon that controls a computer to function as units comprising:
a main object detecting unit that detects a main-object image piece from an image represented by image data; and
a painterly conversion unit that converts the image into a painterly image based on a ratio of a region representing the main-object image piece to the whole image,
wherein when the ratio of the region representing the main-object image piece to the whole image is less than a predetermined threshold, the painterly conversion unit (i) specifies within the whole image a trimming region including the region representing the main-object image piece, the region representing the main-object image piece having a predetermined ratio to the specified trimming region, (ii) cuts out an image piece in the specified trimming region, and (iii) converts the image piece into a painterly image by a touch with a predetermined roughness.

8. A non-transitory computer-readable storage medium having a program stored thereon that controls a computer to function as units comprising:
a main object detecting unit that detects a main-object image piece from an image represented by image data;
a painterly conversion unit that converts the image into a painterly image based on a ratio of a region representing the main-object image piece to the whole image; and
an image outputting unit that outputs the image having undergone painterly conversion by the painterly conversion unit,
wherein:

the painterly conversion unit, when the ratio of the region representing the main-object image piece to the whole image is less than a predetermined threshold, (i) specifies within the whole image a first trimming region including the region representing the main-object image piece, a ratio of the region representing the main-object image piece to the first trimming region being a first ratio, (ii) specifies a second trimming region including the region representing the main-object image piece, a ratio of the region representing the main-object image piece to the second trimming region being a second ratio different from the first ratio, (iii) cuts out respective image pieces in the first and second trimming regions from the whole image, and (iv) converts the cut images into respective painterly images so that the larger the ratio of the region representing the main-object image piece to each of the first and second trimming regions is, the rougher a touch of the converted image becomes, and the image outputting unit successively outputs the images having undergone painterly conversion by the painterly conversion unit in each of the first and second trimming regions in an order that the ratio of the region representing the main-object image piece to each of the first and second trimming regions is small.

* * * * *